(12) United States Patent
Son et al.

(10) Patent No.: US 11,740,681 B2
(45) Date of Patent: Aug. 29, 2023

(54) ELECTRONIC DEVICE AND APPLICATION MANAGING METHOD THEREOF

(71) Applicant: Samsung Electronics Co., Ltd., Gyeonggi-do (KR)

(72) Inventors: Hongjung Son, Gyeonggi-do (KR); Myungah Kim, Gyeonggi-do (KR); Gyeongshin Song, Gyeonggi-do (KR); Jieun Song, Gyeonggi-do (KR); Chul Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 16/790,873

(22) Filed: Feb. 14, 2020

(65) Prior Publication Data

US 2020/0264686 A1 Aug. 20, 2020

(30) Foreign Application Priority Data

Feb. 18, 2019 (KR) .......................... 10-2019-0018852

(51) Int. Cl.
*G06F 1/32* (2019.01)
*G06F 1/3234* (2019.01)
*G06F 8/61* (2018.01)

(52) U.S. Cl.
CPC .............. *G06F 1/3234* (2013.01); *G06F 8/62* (2013.01)

(58) Field of Classification Search
CPC ..................................... G06F 1/26; G06F 1/32
See application file for complete search history.

(56) References Cited

U.S. PATENT DOCUMENTS

| 7,054,649 | B2 | 5/2006 | Yamazaki et al. |
| 7,583,951 | B2 * | 9/2009 | Gibbs ............... H04W 52/0264 |
| | | | 455/425 |
| 8,397,087 | B1 * | 3/2013 | Gardner .................. G06F 1/329 |
| | | | 713/340 |
| 9,588,568 | B2 | 3/2017 | Kim et al. |
| 9,781,542 | B2 | 10/2017 | Rangarajan et al. |

(Continued)

FOREIGN PATENT DOCUMENTS

KR 10-2016-0105274 A 9/2016

OTHER PUBLICATIONS

International Search Report dated Jun. 11, 2020.
European Search Report dated Aug. 13, 2020.

*Primary Examiner* — Phil K Nguyen
(74) *Attorney, Agent, or Firm* — Cha & Reiter, LLC

(57) ABSTRACT

An electronic device is disclosed, including: a display, a processor, and a memory operatively connected to the processor, the memory storing instructions and a plurality of applications installed in the electronic device, wherein the instructions, which when executed, cause the processor to: identify states for each of the plurality of applications, the states each including one of an enabled state, a sleep state, or a disabled state, wherein applications in the sleep state are grouped into a first application group, and applications in the disabled state are grouped into a second application group, execute a first application to display a first field, a second field, and a third field including a selectable object via the display, and based on a first user input selecting the selectable object, re-identity the states of each of the plurality of applications to update the first application group and the second application group.

17 Claims, 21 Drawing Sheets

(56) References Cited

U.S. PATENT DOCUMENTS

| | | | |
|---|---|---|---|
| 10,423,514 B1* | 9/2019 | Padidar | H04W 4/60 |
| 2006/0053320 A1* | 3/2006 | Lin | G06F 1/3287 |
| | | | 713/300 |
| 2006/0112292 A1* | 5/2006 | Lin | G06F 1/3215 |
| | | | 713/320 |
| 2007/0143713 A1* | 6/2007 | Hosoki | G06F 9/485 |
| | | | 345/618 |
| 2010/0145643 A1* | 6/2010 | Katpelly | H04W 52/0258 |
| | | | 702/63 |
| 2011/0191609 A1* | 8/2011 | Van Bokhoven | G06F 1/3206 |
| | | | 713/320 |
| 2012/0005490 A1* | 1/2012 | Goraczko | G06F 1/3206 |
| | | | 713/300 |
| 2012/0110360 A1* | 5/2012 | Lin | G06F 1/3215 |
| | | | 713/320 |
| 2012/0179744 A1* | 7/2012 | Sullivan | H04L 67/02 |
| | | | 709/203 |
| 2012/0315960 A1* | 12/2012 | Kim | H04W 52/0254 |
| | | | 455/574 |
| 2013/0047198 A1* | 2/2013 | Srour | G06F 11/3409 |
| | | | 726/1 |
| 2013/0067378 A1* | 3/2013 | Au | G06F 11/32 |
| | | | 715/771 |
| 2013/0283275 A1 | 10/2013 | Kim et al. | |
| 2015/0277533 A1 | 10/2015 | Kim et al. | |
| 2015/0332030 A1 | 11/2015 | Parhar et al. | |
| 2016/0253187 A1 | 9/2016 | Kim et al. | |
| 2016/0335265 A1 | 11/2016 | Park et al. | |
| 2017/0300103 A1 | 10/2017 | Wei et al. | |
| 2017/0353817 A1 | 12/2017 | Rangarajan et al. | |
| 2017/0357413 A1* | 12/2017 | Green | G06F 9/451 |
| 2018/0189069 A1 | 7/2018 | Huang et al. | |
| 2019/0095074 A1 | 3/2019 | Huang et al. | |
| 2019/0332159 A1 | 10/2019 | Wei et al. | |
| 2020/0125135 A1 | 4/2020 | Green | |

* cited by examiner

ELECTRONIC DEVICE AND APPLICATION MANAGING METHOD THEREOF

CROSS-REFERENCE TO RELATED APPLICATION(S)

This application is based on and claims priority under 35 U.S.C. § 119 to Korean Patent Application No. 10-2019-0018852, filed on Feb. 18, 2019, in the Korean Intellectual Property Office, the disclosure of which is incorporated by reference herein its entirety.

BACKGROUND

1. Field

The present disclosure relate to a device and a method for managing an application of an electronic device.

2. Description of Related Art

An electronic device may provide a variety of services. For example, portable electronic devices, such as smart phones and tablet computers, are evolving to provide more convenience to users by implementation of diverse complex functions. For example, due to popularization of devices such as smart phones, various applications are executable by the electronic devices.

Generally, these applications may be executed, for example, upon a request from a user to perform one or more commands or functions, automatically (e.g., in response to some pre-indicated condition), and/or according to a preset condition to perform one or more operations.

The above information is presented as background information only to assist with an understanding of the disclosure. No determination has been made, and no assertion is made, as to whether any of the above might be applicable as prior art with regard to the disclosure.

SUMMARY

The applications in a portable device operate using certain resources, such as a power source (e.g., a battery, a network, a memory, a processor, etc.) provided by the electronic device. Further, for example, some applications may be executed in a "background" state, and therefore consume resources of the electronic device even while an associated execution screen is not displayed.

Aspects of the disclosure are to address at least the above-mentioned problems and/or disadvantages and to provide at least the advantages described below. Accordingly, an aspect of the disclosure is to provide an electronic device and an application management method of the electronic device in which states of applications installed in the electronic device are classified into an enabled state, a sleep state and a disabled state, thereby to reduce battery consumption of the electronic device.

In accordance with an aspect of the disclosure, an electronic device may include a display, a memory operatively connected to the processor, the memory storing instructions and a plurality of applications installed in the electronic device, wherein the instructions, which when executed, cause the processor to: identify states for each of the plurality of applications, the states each including one of an enabled state, a sleep state, or a disabled state, wherein applications in the sleep state are grouped into a first application group, and applications in the disabled state are grouped into a second application group, execute a first application to display a first field, a second field, and a third field including a selectable object via the display, and based on a first user input selecting the selectable object, re-identity the states of each of the plurality of applications to update the first application group and the second application group.

In accordance with another aspect of the disclosure, a method for managing an application of an electronic device may include identifying, by a processor, states for each of a plurality of applications, the states each including one of an enabled state, a sleep state, or a disabled state, wherein applications in the sleep state are grouped into a first application group, and applications in the disabled state are grouped into a second application group, executing a first application to display, on a display, a first field, a second field, and a third field including a selectable object.

In accordance with still another aspect of the disclosure, an electronic device may include a display, a processor, and a memory operatively connected to the processor, the memory storing instructions and a plurality of applications installed in the electronic device, wherein the instructions when executed, cause the processor to identify states for each of a plurality of applications installed in the electronic device, the states each including one of an enabled state, a sleep state, or a disabled state, based on receiving a first signal from an external electronic device indicating that a first application from among the plurality of applications is in the sleep state, generate a first log information indicating that the first application is installed in the electronic device, and based on receiving a second signal from the external electronic device associated indicating that a second application from among the plurality of applications is in the disabled state, generate a second log information indicating the second application is uninstalled on the electronic device.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In connection with the descriptions of the drawings, the same or similar reference numerals may be used for the same or similar components.

DETAILED DESCRIPTION

Figure 1:
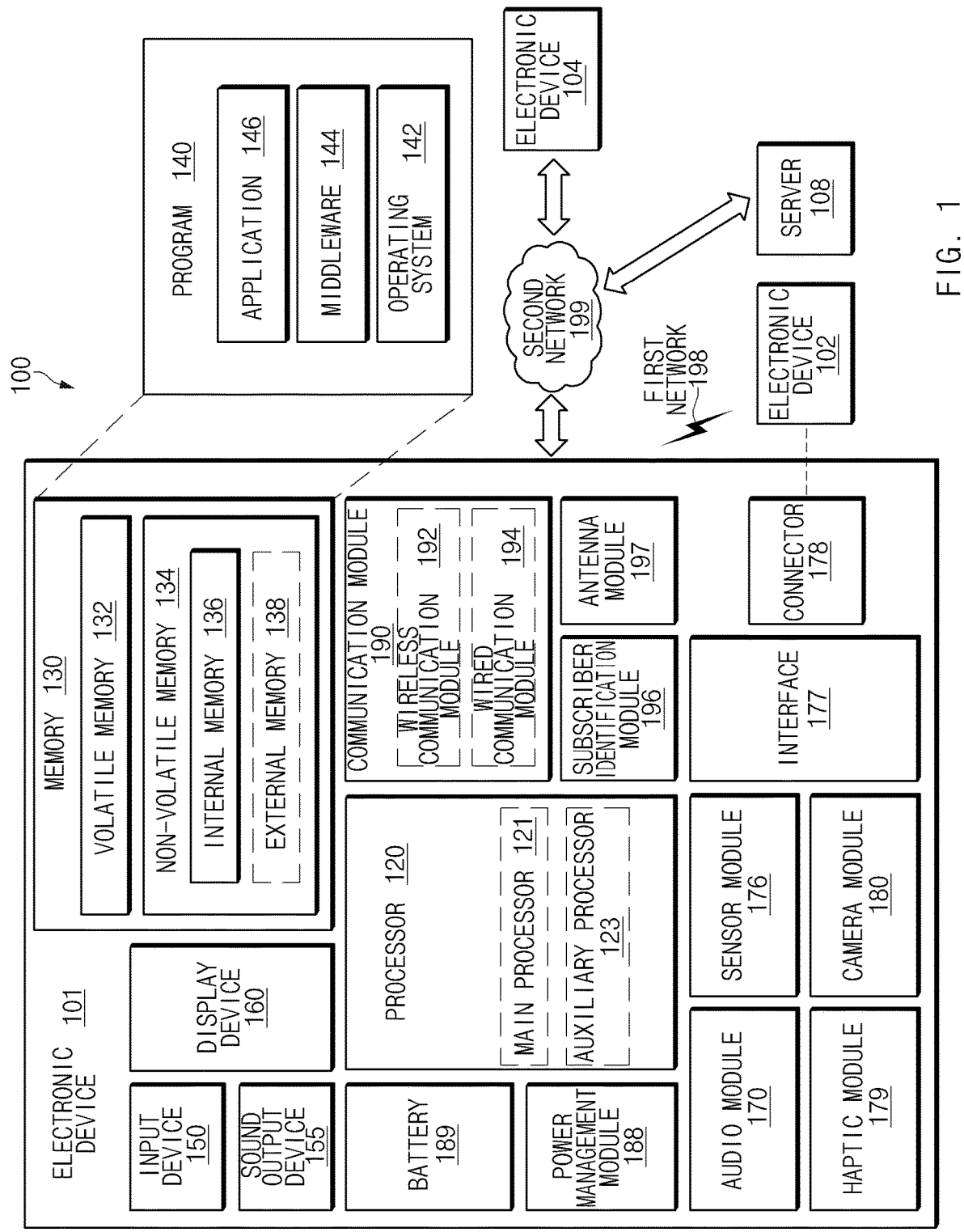
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states associated with at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally associated with the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., the wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., the LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., an external electronic device) of the electronic device 101. According to an embodiment, the antenna module 197 may include an antenna including a radiating element implemented using a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service associated with the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
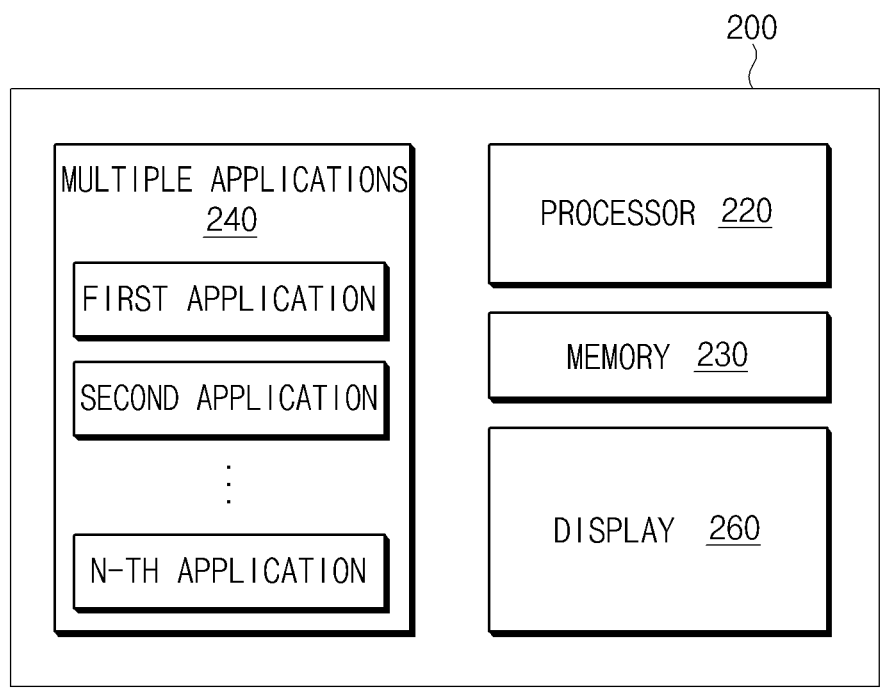
FIG. 2 is a block diagram illustrating an electronic device according to an embodiment disclosed in the disclosure.

FIG. 2 is a block diagram illustrating an electronic device 200 according to an embodiment disclosed in the disclosure.

Referring to FIG. 2, the electronic device 200 (e.g., the electronic device 101 of FIG. 1) may include a processor 220 (e.g., the processor 120 of FIG. 1), a memory 230 (e.g., the memory 130 of FIG. 1), a display 260 (e.g., the display device 160 in FIG. 1), and a plurality of applications 240 (e.g., the application 146 in FIG. 1).

According to an embodiment, the electronic device 200 may include, for example, a smartphone, a tablet, a wearable device, a consumer electronic device, or a digital camera.

The display 260 may be electrically connected to the processor 220. The display 260 may visually provide various information. For example, the display 260 may display image data. In an embodiment, the display 260 may be a touch screen display. When the display 260 is the touch screen display, user input may be received via the display 260.

The memory 230 may store a command, information or data associated with operations of components included in the electronic device 200. For example, the memory 230 may store instructions for enabling the processor 220 to perform various operations as described in the disclosure during execution.

The processor 220 may be operatively connected to the plurality of applications 240, the memory 230, and the display 260 to perform overall functions of the electronic device 200. The processor 220 may include one or more processors in one example. One or more processors may include, for example, an image signal processor (ISP), an application processor (AP), or a communication processor (CP).

The processor 220 may execute the plurality of applications 240 according to a request associated with execution of the application. In an embodiment, the request associated with the execution of the application may be a user input. In an embodiment, when a specific application is executed, and when another application needs to be executed together with the specific application though there is no separate user input, the request associated with the execution of the application may be associated with a case where the specific application is executed.

In an embodiment, the processor 220 may identify a state of each of the plurality of applications 240 installed in the electronic device. For example, the processor 220 may identify whether a state of each of the plurality of applications 240 is an enabled state, a sleep state, or a disabled state.

The processor 220 may identify an application identified to have the enabled state among the plurality of applications 240. For example, when the plurality of applications 240 includes n applications, where n is a natural number, the processor 220 may identify first, second and third applications identified as having the enabled state.

The processor 220 may group applications identified as having the sleep state among the plurality of applications 240 into a first application group. For example, when the plurality of applications 240 includes n applications, where n is a natural number, the processor 220 may include fourth and fifth applications identified as having the sleep state to the first application group. The processor 220 may create a list of applications included in the first application group.

The processor 220 may group applications identified as having the disabled state among the plurality of applications 240 into a second application group. For example, when the plurality of applications 240 includes n applications, where n is a natural number, the processor 220 may include sixth and seventh applications identified as having the disabled state into the second application group. The processor 220 may create a list of applications included in the second application group.

Each list may include unique identification information of the applications.

The processor 220 may transmit information on the list of the first application group and information on the list of the second application group to one application of the plurality of applications 240. For example, the processor 220 may transmit information about the list of the first application group and information about the list of the second application group to the first application based on user input through the first application.

In an embodiment, the processor 220 may again identify a state of each of the plurality of applications 240 even after grouping of the plurality of applications 240 is completed. The processor 220 may update one of the first application group (and/or the list of the first application group) and the second application group (and/or the list of the second application group) based on change in the identified state of the application.

For example, when an enable event occurs for the sixth application that is in the disabled state, the processor 220 may exclude the sixth application from the second application group to update the second application group. The enable event may include, for example, a case when a user selects an object that may change the state of the sixth application displayed in an user interface, a case when the user selects an icon for the sixth application displayed in the user interface, a case when another application connected to the sixth application is executed and thus the sixth application is executed without a separate user input, and a case when the sixth application is enabled based on a periodic use pattern. The periodic user pattern may indicate average recurring usages of one or more applications. For example, the electronic device may track activations, deactivations, and respective activation times, deactivation times, length of use, etc. for a particular application over a period of time. This information can be aggregated over the period of time as a periodic use pattern, which may in some cases be stored in the memory (or in other cases, on removable memory or an external device, etc.).

When the disable event occurs for the first application that is in the enabled state, the processor 220 may include the first application into the second application group to update the second application group. The disable event may include, for example, a case when the first application has been unused for a certain duration, and a case when the first application is disabled based on a periodic use pattern.

The processor 220 may transmit a list of the updated first application group and a list of the updated second application group to the first application based on user input through the first application.

In an embodiment, the processor 220 may identify a state of each of the plurality of applications 240 and automatically update the application group based on the identification result. For example, the processor 220 may identify a periodic use pattern for each of the plurality of applications 240. When the periodic use pattern is identified for the third application of the plurality of applications 240, the processor 220 may set the third application to the disabled state during a first time duration based on the periodic use pattern (e.g., an average time span in which, as indicated in the periodic use pattern, that the third application is generally deactivated), and may update the second application group. When the first time duration has lapsed, the processor 220 may set the third application to the enabled state during a second time duration, based on the periodic use pattern (e.g., again, based on an average second time span in which the third application is generally activated, as indicated in the periodic user pattern). When there is a user input during the second time duration, the processor 220 may keep the third application in the enabled state. When there is no user input during the second time duration and the second time duration has lapsed, the processor 220 may identify user input associated with execution of the third application during a third time duration. When a user input associated with the execution of the third application does not occur during the third time duration, the processor 220 may change a state of the third application to the disabled state and may update the second application group. When processor 220 repeatedly identifies that there is no user input during the second time duration, the processor 220 may remove the periodic use pattern for the third application. For example, the processor 220 may not automatically update the state of the third application when the processor 220 repeatedly identifies times greater than or equal to a certain number of times that the user input does not exist during the second time duration.

In an embodiment, the processor 220 may create first log information that the fourth application is installed on the electronic device 200 in response to receiving a signal associated with the fourth application included in the first application group from an external electronic device (e.g., the electronic device 102 and/or the electronic device 104 of FIG. 1)

The processor 220 may create second log information including a situation opposite to the situation included in the first log information based on receiving a signal associated with the sixth application included in the second application group from the external electronic device. In other words, an application with the disabled state may be regarded as not being installed in the electronic device 200. However, the processor 220 may display an icon of the sixth application having the disabled state on the user interface.

In an embodiment, the processor 220 may store first data associated with the fourth application included in the first application group in the memory 230. In other words, when the fourth application is identified as having the sleep state, the processor 220 may not delete the first data from memory 230. The processor 220 may store second data associated with the sixth application included in the second application group in the memory 230. In other words, when the sixth application is identified as having the disabled state, the processor 220 may not delete the second data from memory 230.

In an embodiment, when intending to execute the fourth application that is in the sleep state via the second application, the processor 220 may execute the fourth application based on user input associated with executing the fourth application immediately. For example, the second application may display a first state object that displays a state of the fourth application as a first state on the user interface via the display 260. The user may touch the first state object to execute the fourth application. The processor 220 may execute the fourth application based on the user input of touching the first state object.

When intending to execute the sixth application that is in the disabled state via the second application, the processor 220 may execute the sixth application based on at least two times user inputs. For example, the second application may display a second state object displaying a state of the sixth application as a second state on the user interface via the display 260. The user may touch the second state object to change the state of the sixth application to the first state. The processor 220 may update the second application group by excluding the sixth application from the second application group based on the user input of touching the second state object. The sixth application may be regarded as being in an executable or enabled state. The processor 220 may transmit, for example, a list of the updated second application group to the second application. The second application may display a third state object displaying the state of the sixth application as the first state on the user interface via the display 260, based on the user input touching the second state object. The user may touch the third state object to execute the sixth application. The processor 220 may execute the sixth application based on the user input of touching the third state object.

The electronic device 200 may include at least one additional component in addition to the components illustrated in FIG. 2. For example, the electronic device 200 may include a communication module or a connection terminal for performing communication with an external electronic device (e.g., the electronic device 102 and/or the electronic device 104 of FIG. 1). According to an embodiment, the components of the electronic device 200 may be the same entity or be implemented as separate entities.

Hereinafter, with reference to FIG. 2, FIG. 3, FIG. 4, FIG. 5A, FIG. 5B, FIG. 5C, FIG. 6A, FIG. 6B, FIG. 6C, FIG. 6D, FIG. 7A, FIG. 7B, and FIG. 8, the disclosure illustrates an operation of the electronic device 200 according to an embodiment disclosed in the disclosure. For the sake of clarity of illustration, duplicates of those as exemplified above are briefly described or omitted.

Figure 3:
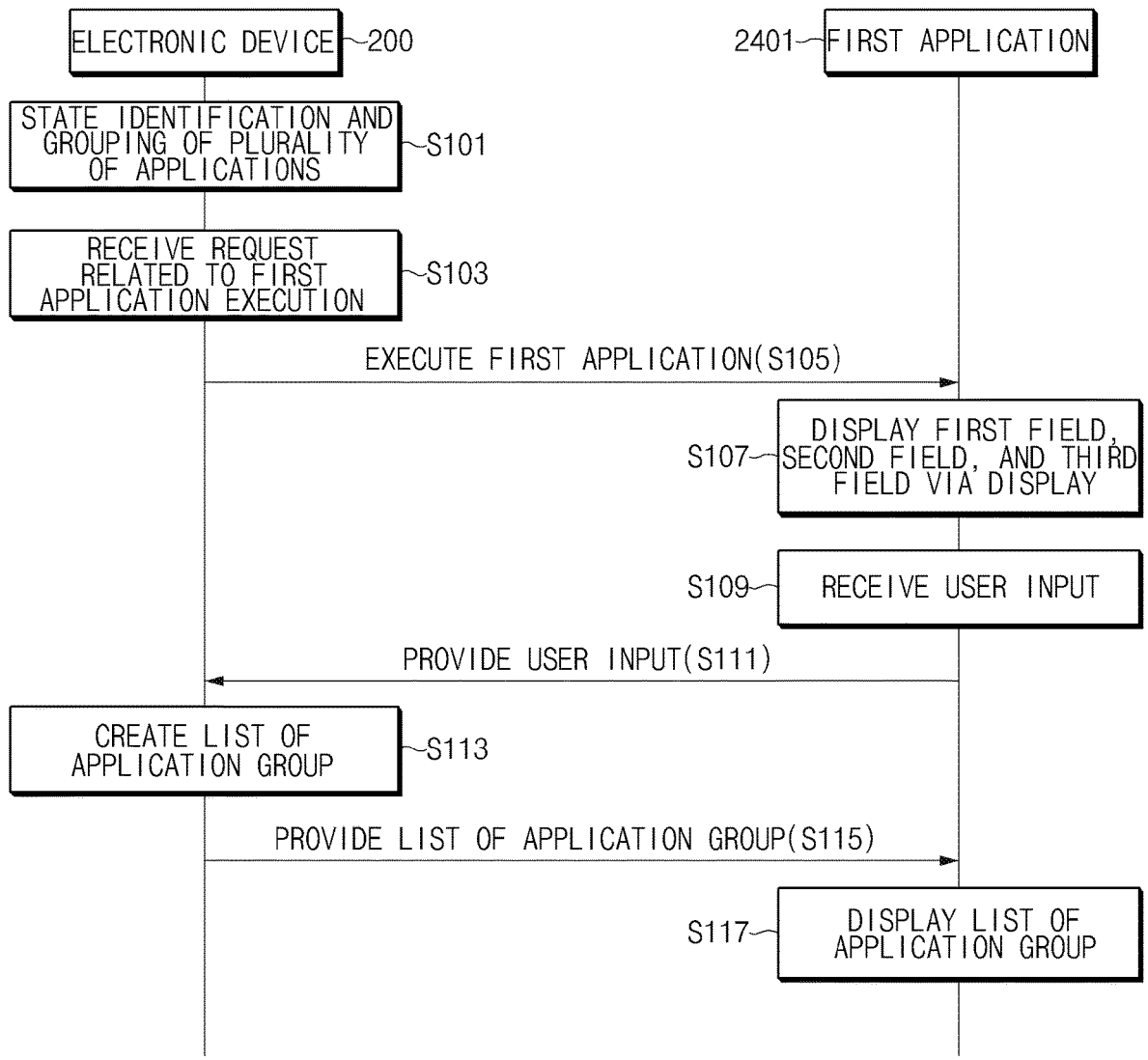
FIG. 3 is a flow chart for illustrating an operation of the electronic device according to an embodiment disclosed in the disclosure.
Figure 4:
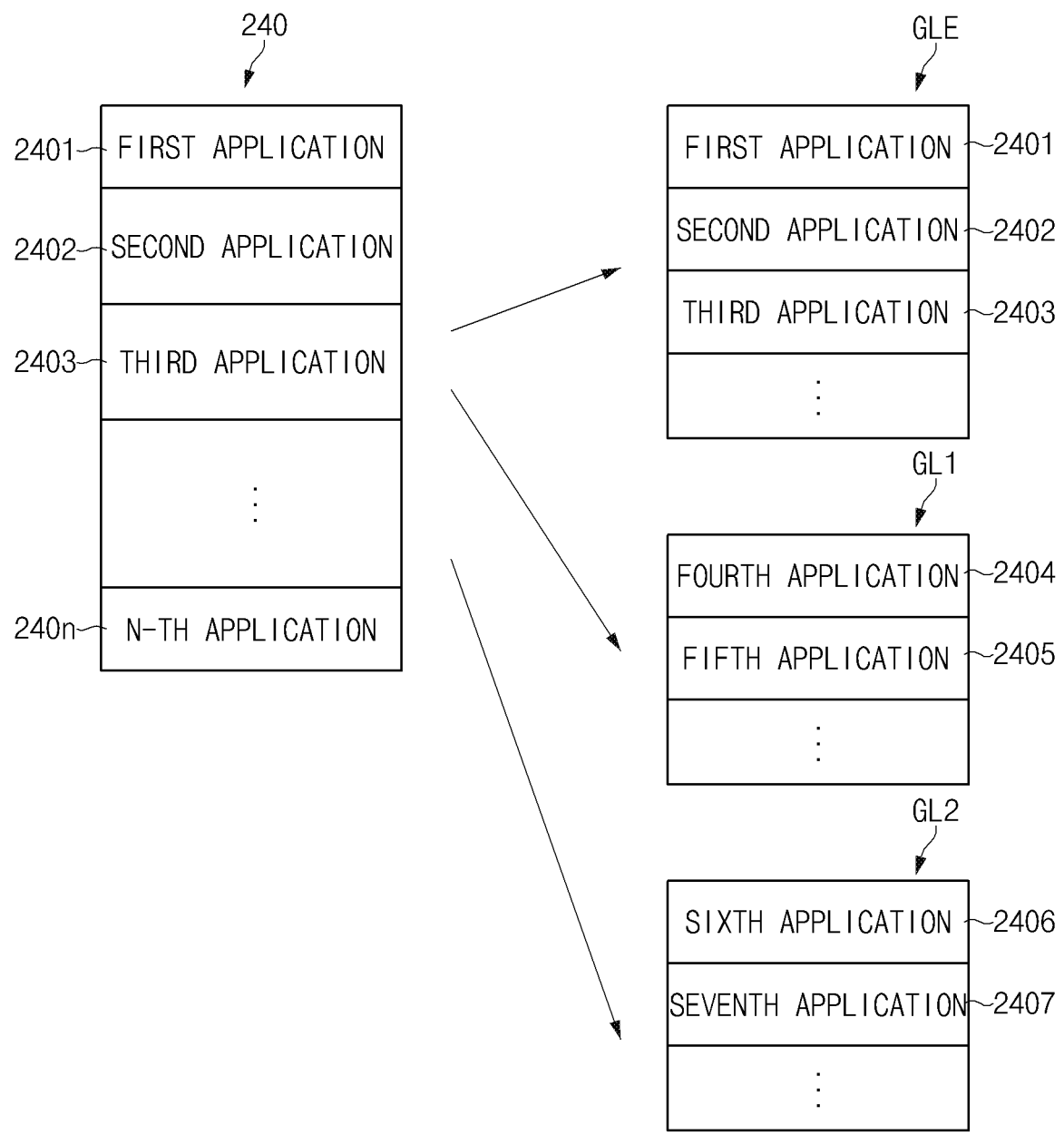
FIG. 4 is a view for illustrating an operation of an electronic device to create first and second application groups based on a state of each of a plurality of applications according to an embodiment disclosed in the disclosure.
Figure 5A:
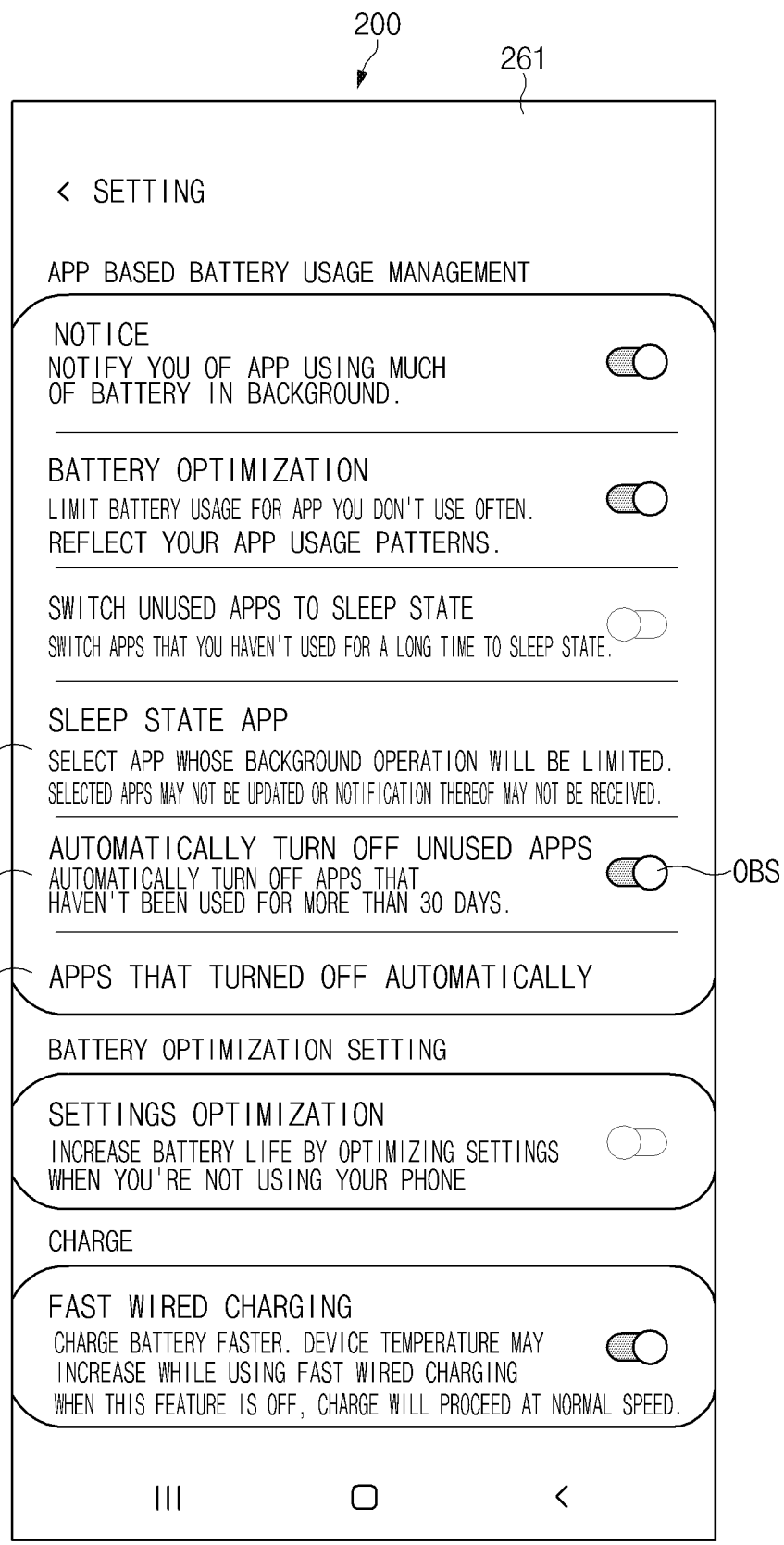
FIG. 5A is a view for illustrating an operation of a first application according to an embodiment disclosed in the disclosure.
Figure 5B:
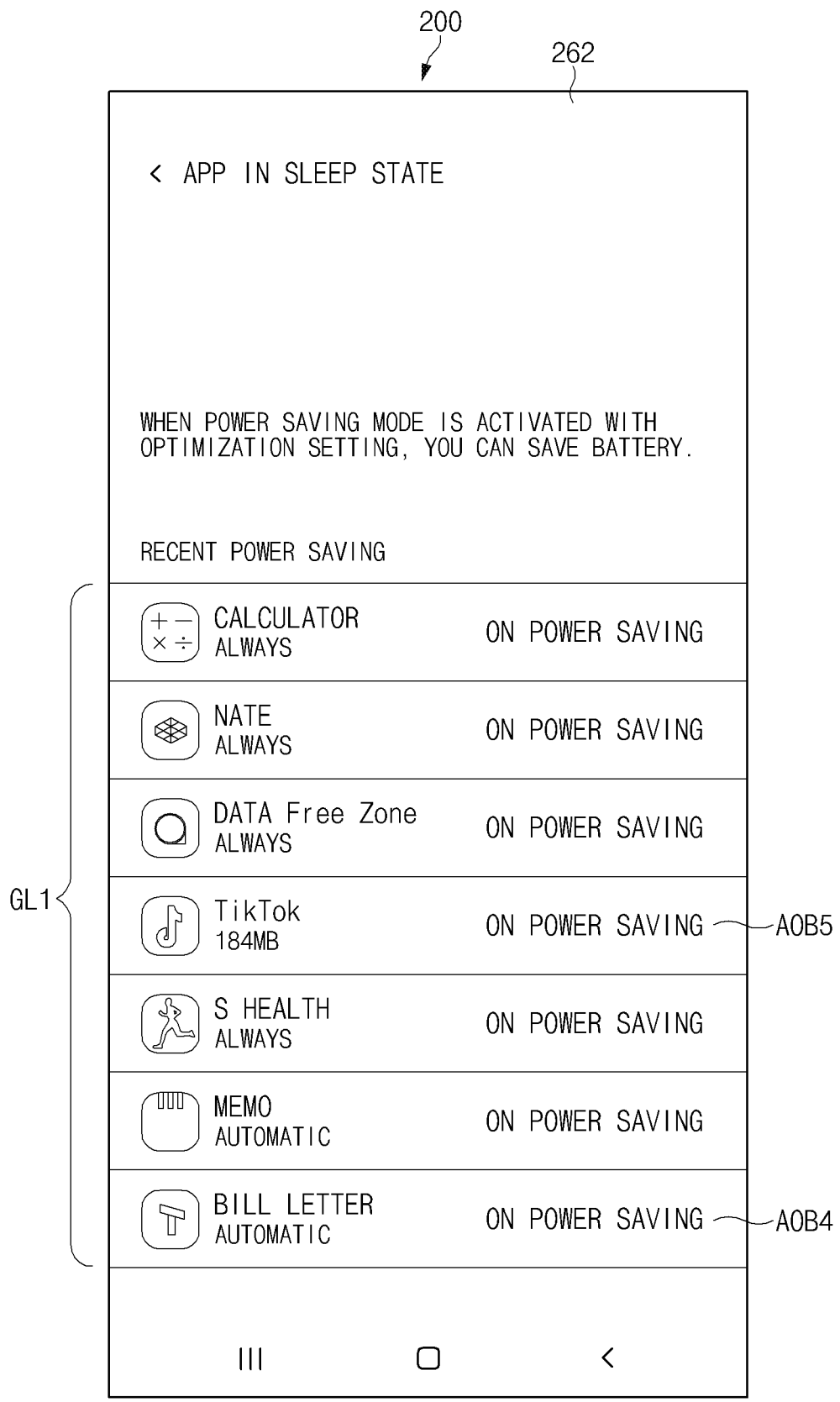
FIG. 5B is a view for illustrating a first application group according to an embodiment disclosed in the disclosure.
Figure 5C:
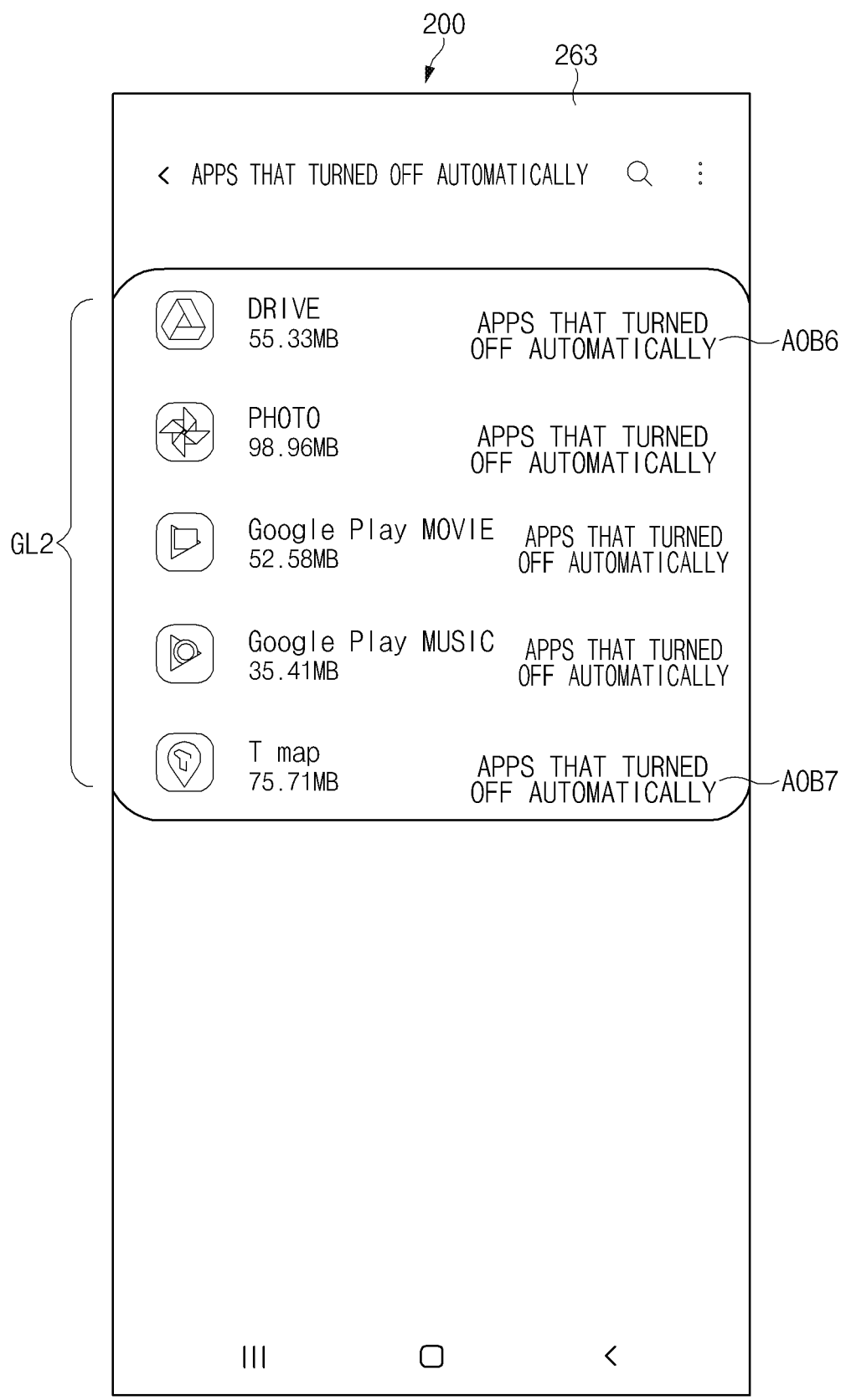
FIG. 5C is a view for illustrating a second application group according to an embodiment disclosed in the disclosure.
Figure 6A:
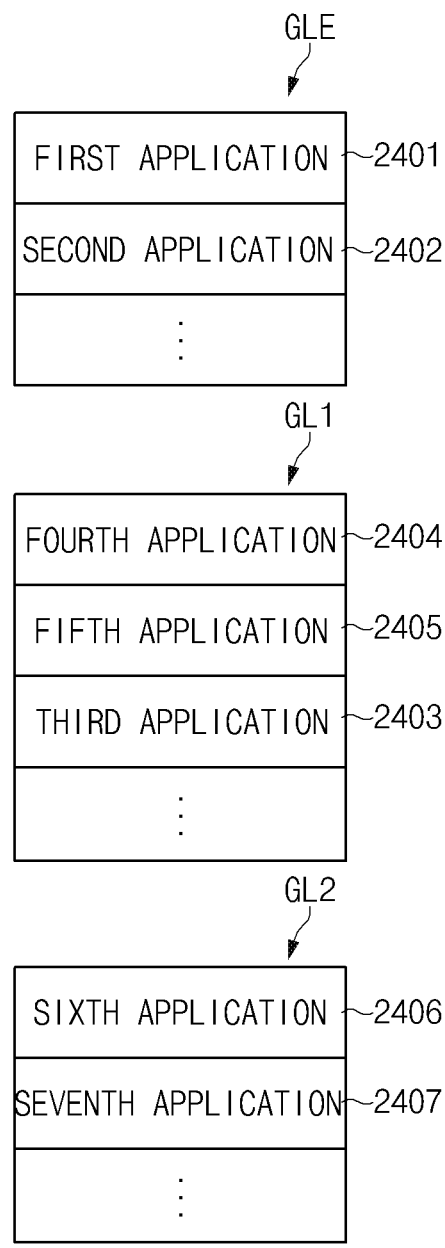
FIG. 6A is a view for illustrating an operation of an electronic device to update a first application group according to an embodiment disclosed in the disclosure.
Figure 6B:
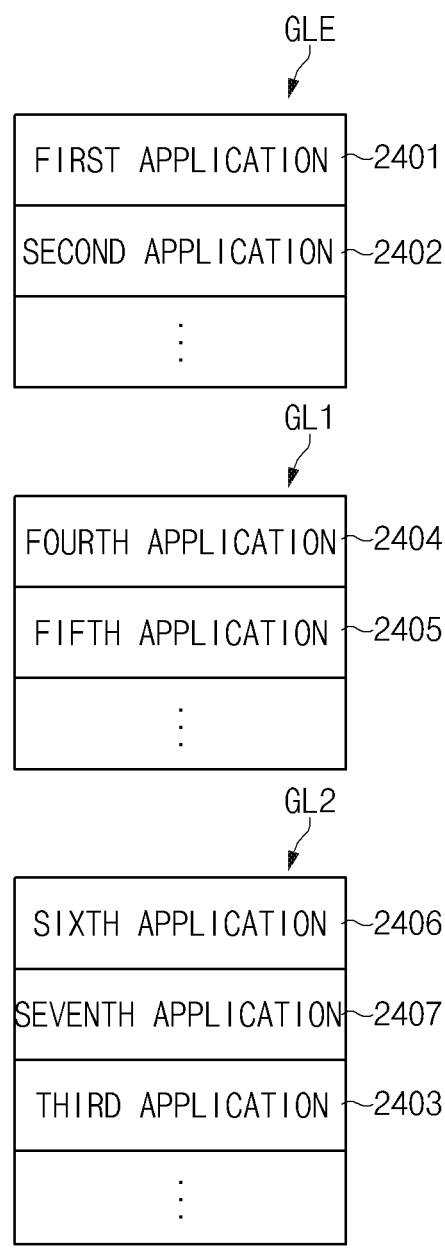
FIG. 6B is a view for illustrating an operation of an electronic device to update a second application group according to an embodiment disclosed in the disclosure.
Figure 6C:
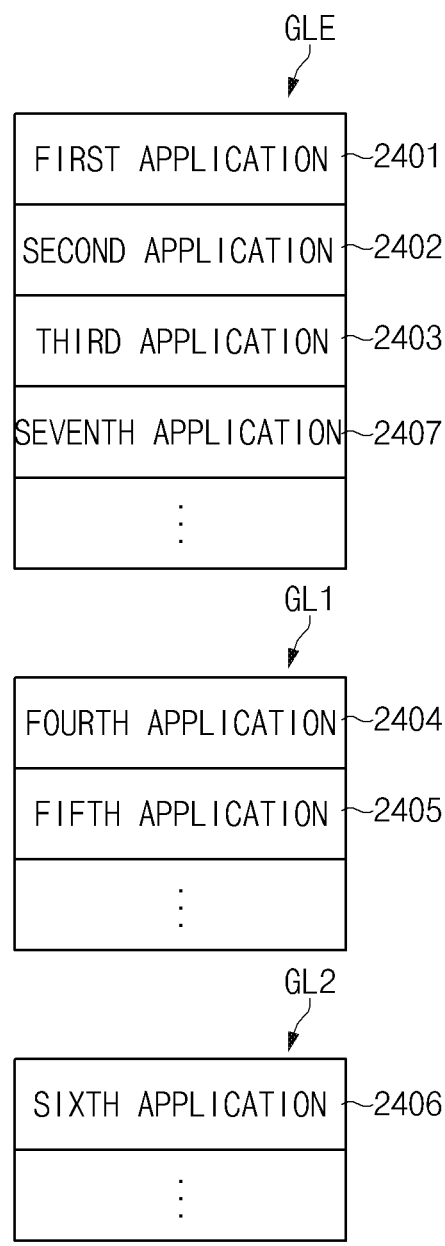
FIG. 6C is a diagram illustrating an operation of updating an application group having an enabled state by an electronic device according to an embodiment disclosed in the disclosure.
Figure 6D:
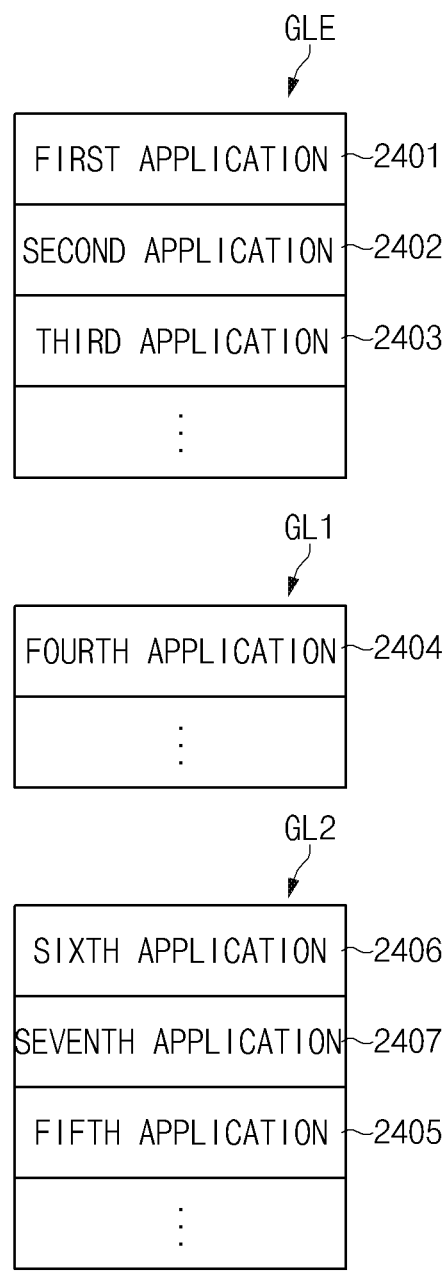
FIG. 6D is a diagram for illustrating an operation in which an electronic device updates a first application group according to an embodiment disclosed in the disclosure.
Figure 7A:
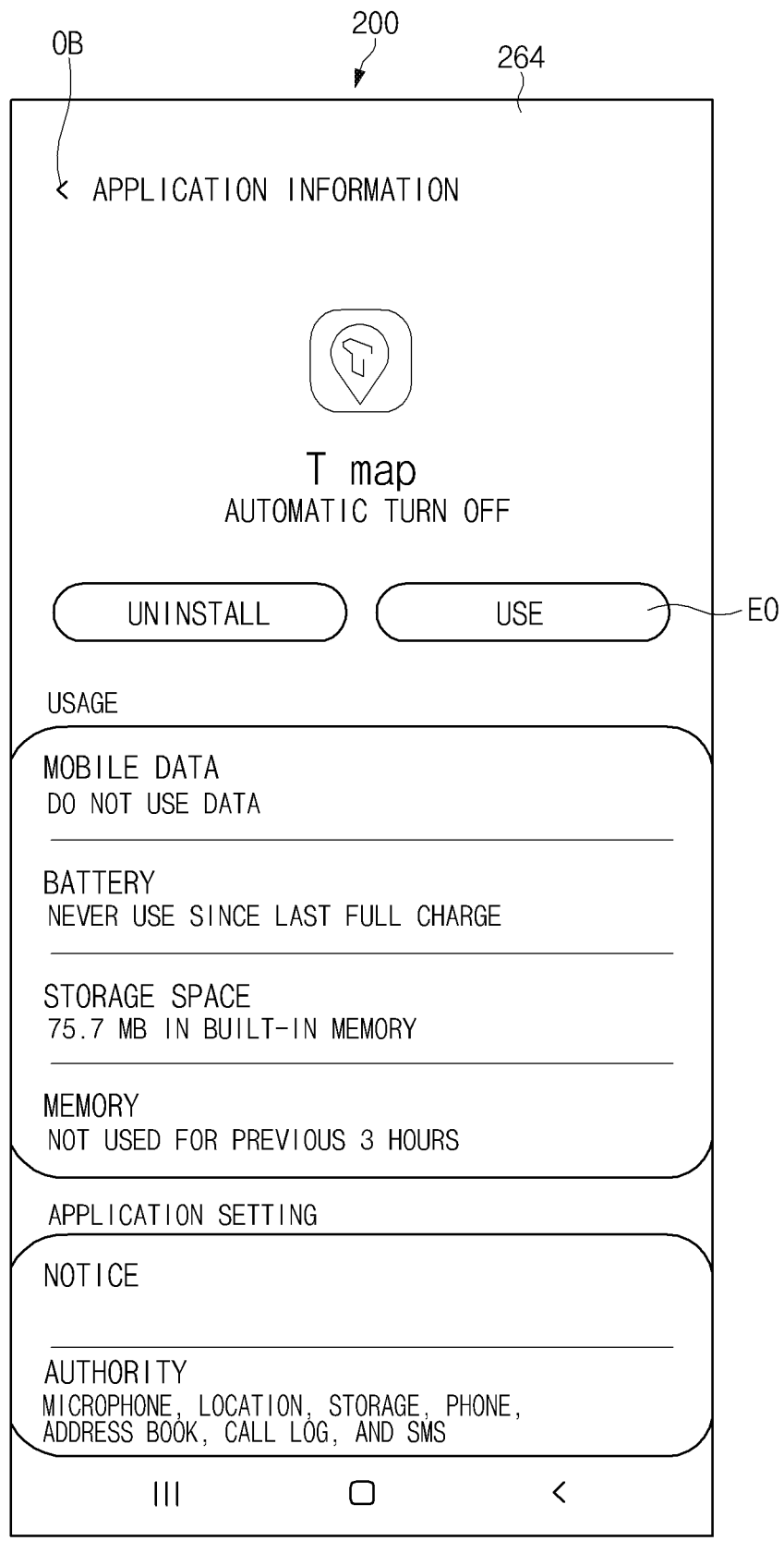
FIG. 7A is a diagram for illustrating an enable event according to an embodiment disclosed in the disclosure.
Figure 7B:
FIG. 7B is a diagram for illustrating an enable event according to an embodiment disclosed in the disclosure.
Figure 8:
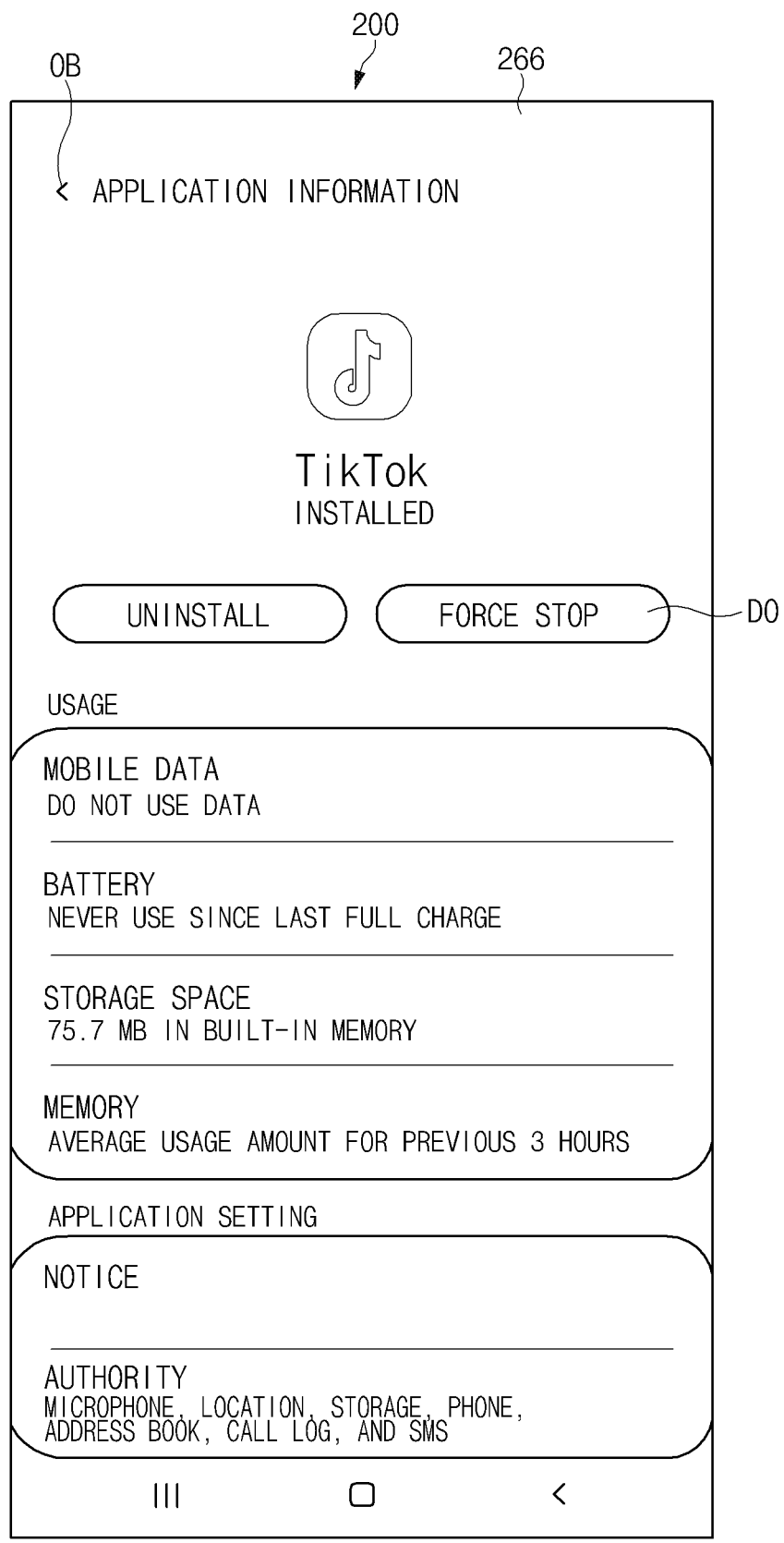
FIG. 8 is a diagram for illustrating a disable event according to an embodiment disclosed in the disclosure.

FIG. 3 is a flow chart for illustrating an operation of the electronic device 200 according to an embodiment disclosed in the disclosure. FIG. 4 is a diagram illustrating an operation in which the electronic device 200 creates first and second application groups GL1 and GL2 based on states of the plurality of applications 240 according to an embodiment disclosed in the disclosure. FIG. 5A is a diagram illustrating an operation of the first application according to an embodiment disclosed in the disclosure. FIG. 5B is a diagram to illustrate the first application group GL1 according to an embodiment disclosed in the disclosure. FIG. 5C is a diagram to illustrate the second application group GL2 according to an embodiment disclosed in the disclosure. FIG. 6A is a diagram illustrating an operation in which the electronic device 200 updates the first application group GL1 according to an embodiment disclosed in the disclosure. FIG. 6B is a diagram illustrating an operation of updating the second application group GL2 by the electronic device 200 according to an embodiment disclosed in the disclosure. FIG. 6C is a diagram illustrating an operation of updating an application group GLE having the enabled state by the electronic device 200 according to an embodiment disclosed in the disclosure. FIG. 6D is a diagram illustrating an operation in which the electronic device 200 updates the first application group GL1 according to an embodiment disclosed in the disclosure. FIG. 7A is a diagram illustrating an enable event according to an embodiment disclosed in the disclosure. FIG. 7B is a diagram illustrating an enable event according to an embodiment disclosed in the disclosure. FIG. 8 is a diagram illustrating a disable event according to an embodiment disclosed in the disclosure.

Hereinafter, it is assumed that the electronic device 200 of FIG. 2 performs a process of FIG. 3. An operation described as being performed by the electronic device may be implemented using instructions that may be performed or executed by the processor 220 of the electronic device. The instructions may be stored in, for example, a computer recording medium or the memory 230 of the electronic device shown in FIG. 2.

Referring to FIG. 2 and FIG. 3, in operation S101, the electronic device 200 (e.g., the electronic device 200 and/or the processor 220) may identify a state of each of a plurality of applications (e.g., the plurality of applications 240). The electronic device 200 may identify whether the state of each of the plurality of applications corresponds to the enabled state, the sleep state, or the disabled state.

The enabled state may mean, for example, a state in which the application may be executable in the electronic device 200. The enabled state may mean, for example, a state in which an operation of the application may be permitted in the electronic device 200. The enabled state may mean, for example, a state in which the application is not executed currently in the electronic device 200 but the application is not the sleep state or the disabled state. The enabled state may mean, for example, a state in which when a signal (e.g., a message) associated with the application is received from the external device, the received signal may be immediately transmitted to a user. The enabled state may mean, for example, a state in which an automatic update may be executed. The enabled state may mean, for example, a state in which the application is being executed in a background.

The sleep state may mean, for example, a state in which an operation of a portion of an operation of the application is prohibited. The sleep state may mean, for example, a state in which an operation of the application is stopped but which may be automatically re-executed in the electronic device 200. The sleep state may mean, for example, a state in which when a signal (e.g., a message) associated with the application is received from an external device, the electronic device 200 (e.g., the processor 220 and/or a package manager included in the middleware 144 in FIG. 1) identifies that the application is installed therein, but may not deliver the received signal to the user because the electronic device 200 does not deliver the received signal to the application. The sleep state may mean, for example, a state in which an automatic update may or may not be executed. The sleep state may mean, for example, a state in which data associated with the application is not removed from the memory.

The disabled state may mean, for example, a state in which all operations of the application are prohibited. The disabled state may mean, for example, a state in which an operation of the application is stopped, and is not automatically re-executed in the electronic device 200. The disabled state may mean, for example, a state in which when a signal (e.g., a message) associated with the application is received from an external device, the electronic device 200 (e.g., the processor 220 and/or the package manager, included in the middleware 144 in FIG. 1) identifies that the application is not installed on the electronic device 200 and thus the received signal may not be delivered to the user. The disabled state may mean, for example, a state in which an automatic update is not executed. The disabled state may mean, for example, a state in which the application and data associated with the application are not removed from the memory.

The electronic device 200 may group the plurality of applications 240 based on the identified state of each of the plurality of applications 240. For example, the electronic device 200 may group applications having the sleep state among the plurality of applications 240 into the first application group. For example, the electronic device 200 may group applications having the disabled state among the plurality of applications into the second application group.

Referring to FIG. 4, the plurality of applications 240 may be installed in the electronic device 200. The plurality of applications 240 may include n applications, where n is a natural number. The electronic device 200 may identify fourth and fifth applications 2404 and 2405 having the sleep state among the plurality of applications 240, and may group the fourth and fifth applications 2404 and 2405 into a first application group GL1. The electronic device 200 may identify sixth and seventh applications 2406 and 2407 having the disabled state among the plurality of applications 240, and may group the sixth and seventh applications 2406 and 2407 into a second application group GL2. An application group GLE having the enabled state may include applications not included in the first application group GL1 and the second application group GL2.

In an embodiment, the electronic device 200 may identify a state of each of the plurality of applications in real time, and update each of the first application group and the second application group.

In an embodiment, the electronic device 200 may identify a state of each of the plurality of applications every certain period, and update each of the first application group and the second application group.

Referring back to FIG. 2 and FIG. 3, in operation S103, the electronic device 200 may receive a request associated with execution of a first application 2401 of the plurality of applications 240.

In an embodiment disclosed in the disclosure, the operation S101 and the operation S103 may be executed sequentially or simultaneously. Alternatively, after the operation S103 is executed, the operation S101 may be executed.

In operation S105, the electronic device 200 may cause the first application 2401 to be executed.

In operation S107, execution and display of the first application 2401 may including display of a first field, a second field, and a third field via the display (e.g., the display 260).

Referring to FIG. 5A, a first user interface 261 may be a screen of the first application 2401 as executed which is displayed via the display. For example, the first field C1, the second field C2 and the third field C3 may be displayed via the display. The third field C3 may include a selection object OBS. Each of the first field C1, the second field C2 and the third field C3 may be, for example, a field that the user may select via the display. In an embodiment, when the display is a touch screen display, the user may touch the first field C1, the second field C2, and the third field C3.

When the user selects one of the first field C1, the second field C2, and the third field C3, an instruction corresponding to the selected field may be executed. The user may select the selection object OBS to execute or not to execute an instruction corresponding to the third field C3

Referring back to FIG. 2 and FIG. 3, in operation S109, the first application 2401 may receive a user input. The user input may be intended for identifying states of the plurality of applications 240. Further, the user input may be intended for allowing or disallowing the electronic device 200 to automatically change at least some of the plurality of applications 240 to the disabled state.

In operation S111, the first application 2401 may transmit the user input to the processor of the electronic device 200.

Referring back to FIG. 5A, when the user selects the first field C1, the first application 2401 may display an application having the sleep state to the user. In other words, when the user wants to identify an application having the sleep state, the user may select the first field C1. The user selecting the first field C1 may be referred to as a first user input.

When the user selects the second field C2, the first application 2401 may display an application having the disabled state to the user. In other words, when the user wants to identify an application with the disabled state, the user may select the second field C2. The user selecting the second field C2 may be referred to as a second user input.

When the user selects the third field C3 to activate the selection object OBS, the first application 2401 may identify a state of each of the plurality of applications 240 and transmit a user input including a request to update the application group to the electronic device 200. In other words, when the user selects the third field C3 to activate the selection object OBS, the electronic device 200 may identify a state of each of the plurality of applications 240 and automatically update the application group. Details thereof will be described later with reference to FIG. 9.

When the user selects the third field C3 to deactivate the selection object OBS, the first application 2401 may identify a state of each of the plurality of applications 240 and transmit a user input including a request to stop updating the application group to the electronic device 200.

The user selecting the third field C3 to activate or deactivate the selection object OBS may be referred to as a third user input.

Referring back to FIG. 2 and FIG. 3, in operation S113, the electronic device 200 may create a list which lists applications included in the application group based on the user input.

The list of the application group may include at least one of a name, unique identification information, or a state for each application included in the application group.

For example, the electronic device 200 may create a list of the first application group based on the first user input. For example, the electronic device 200 may create a list of the second application group based on the second user input. For example, the electronic device 200 may update at least one of the first and second application groups based on the third user input to create an updated list.

In operation S115, the electronic device 200 may provide the generated list of applications included in the application group to the first application 2401.

In operation S117, the first application 2401 may display the received list of the application group via the display.

Referring to FIG. 5B, when the user input of the operation S109 of FIG. 3 is received, the electronic device 200 may create a list indicating applications included of the first application group GL1 (the operation S113 of FIG. 3) and transmit the created list to the first application (the operation S115 of FIG. 3). The first application 2401 may display the received list of the first application group GL1 via the display (the operation S117 of FIG. 3). A second user interface 262 may be a screen displayed via the display after the first user input selecting the first field C1 is received.

The electronic device 200 may transmit the list for the first application group GL1 including the fourth application (2404 of FIG. 4) and the fifth application (2405 of FIG. 4), both identified as being in the sleep state to the first application 2401. For example, when the user selects the first field C1 to identify an application with the sleep state, the first application 2401 may display the second user interface 262 via the display based on the list of the first application group GL1 received from the electronic device 200.

The first application 2401 may display an object AOB4 corresponding to the fourth application 2404 and an object AOB5 corresponding to the fifth application 2405 via the display. Each of the object AOB4 and the object AOB5 may display, for example, an icon, a name, and a state of each of the fourth application 2404 and the fifth application 2405 via the display. In other words, the user may view each of the object AOB4 and the object AOB5 and may recognize that the fourth application 2404 and the fifth application 2405 are currently in the sleep state.

Referring to FIG. 5C, when the user input of the operation S109 of FIG. 3 is the second user input, the electronic device 200 may create a list including an applications of the second application group GL2 (the operation S113 in FIG. 3) and transmit (e.g., provide) the created list to the first application 2401 (the operation S115 in FIG. 3). The first application 2401 may display the received list of the second application group GL2 via the display (the operation S117 of FIG. 3). A third user interface 263 may be a screen displayed via the display after the second user input selecting the second field C2 is received.

For example, the electronic device 200 may transmit a list of the second application group GL2 including the sixth application (2406 of FIG. 4) and the seventh application (2407 of FIG. 7) identified as having the disabled state to the first application 2401. For example, when the user selects the second field C2 to identify an application with the disabled state, the first application 2401 may display the third user interface 263 via the display based on the list of the second application group GL2 received from the electronic device 200.

The first application 2401 may display an object AOB6 corresponding to the sixth application 2406 and an object AOB7 corresponding to the seventh application 2407 via the display. Each of the object AOB6 and the object AOB7 may display, for example, an icon, a name, and a state of each of the sixth application 2406 and the seventh application 2407 via the display. In other words, the user may view each of the object AOB6 and the object AOB7 and may recognize that the sixth application 2406 and the seventh application 2407 are currently in the disabled state.

Referring to FIG. 6A, FIG. 6B, FIG. 6C and FIG. 6D, when the user input of the operation S109 of FIG. 3 is the third user input, the electronic device 200 may again identify a state of each of the plurality of applications 240 and may update the first application group GL1 and the second application group GL2 based on the new identifications. The electronic device 200 may create a list for the updated first application group GL1 and a list for the updated second application group GL2 (the operation S113 of FIG. 3) and transmit the created lists to the first application (the operation S115 of FIG. 3). The first application 2401 may display the updated list of the updated first application group GL1 and the updated list of the updated second application group GL2 via the display (the operation S117 of FIG. 3).

Even after creating the application group GLE having the enabled state, the first application group GL1 and the second application group GL2, the electronic device 200 may identify a state of each of the plurality of applications 240.

Referring to FIG. 6A, the electronic device 200 may identify that, for example, a state of the third application 2403 has changed from the enabled state to the sleep state. The electronic device 200 may exclude the third application 2403 from the application group GLE having the enabled state to update the application group GLE having the enabled state. The electronic device 200 may include the third application 2403 into the first application group GL1 to update the first application group GL1. When the electronic device 200 receives the first user input from the first application 2401 after the updating, the electronic device 200 may transmit a list of the updated application group GL1 to the first application 2401. The first application 2401 may further display, for example, an object corresponding to the third application 2403 on the second user interface 262 not as in FIG. 5B.

Referring to FIG. 6B, the electronic device 200 may identify that, for example, the state of the third application 2403 has been changed from the enabled state to the disabled state. The electronic device 200 may by exclude the third application 2403 from the application group GLE having the enabled state to update the application group GLE having the enabled state. The electronic device 200 may include the third application 2403 into the second application group GL2 to update the second application group GL2. When the electronic device 200 receives the second user input from the first application 2401 after the updating, the electronic device 200 may transmit a list of the updated the second application group GL2 to the first application 2401. The first application 2401 may further display, on the third user interface 263, an object that corresponds to the third application 2403 unlike in FIG. 5C.

Referring to FIG. 6C, the electronic device 200 may identify that, for example, a state of the seventh application 2407 has been changed from the disabled state to the enabled state. For example, when the enable event occurs, the state of the seventh application 2407 may be changed from the disabled state to the enabled state. The electronic device 200 may exclude the seventh application 2407 from the second application group GL2 to update the second application group GL2. The electronic device 200 may include the seventh application 2407 into the application group GLE having the enabled state to update the application group GLE having the enabled state. When the electronic device 200 receives the second user input from the first application 2401 after the updating, the electronic device 200 may transmit a list of the updated second application group GL2 to the first application 2401. The first application 2401 may not display, for example, an object corresponding to the seventh application 2407 on the third user interface 263 unlike in FIG. 5C.

Referring to FIG. 7A, in an embodiment, the enable event may include the user selecting an enable object EO.

For example, the user may select the object AOB7 corresponding to the seventh application 2407 in the third user interface 263 of FIG. 5C. When the user selects the object AOB7, the first application 2401 may display a fourth user interface 264 via the display. The fourth user interface 264 may be a screen that displays detailed information of the seventh application 2407 that is in the disabled state.

The fourth user interface 264 may display the enable object EO. When the user selects the enable object EO, the seventh application 2407 may be changed to the enabled state. In this case, the electronic device 200 may identify a state of the seventh application 2407 and may exclude the seventh application 2407 from the second application group GL2 to update the second application group GL2. Further, the electronic device 200 may include the seventh application 2407 into the application group GLE having the enabled state to update the application group GLE having the enabled state. The electronic device 200 may transmit a list of the updated second application group GL2 to the first application 2401.

The user may select an object OB. When the user selects the object OB, the first application 2401 may display, via the display, a previous interface (e.g., the third user interface 263 in FIG. 5C) to the fourth user interface 264. The first application 2401 may not display the object AOB7 corresponding to the seventh application 2407 on the third user interface 263 via the display unlike in FIG. 5C, based on the received list of the updated second application group GL2 from the electronic device 200.

Referring to FIG. 7B, in an embodiment, the enable event may refer to the user selecting an icon IO of the seventh application 2407.

The electronic device 200 may display an icon of an application having the disabled state on a fifth user interface 265. The fifth user interface 265 may be a home screen of the electronic device 200. The fifth user interface 265 may display an icon corresponding to an application among the plurality of applications 240 via the display. When the user selects the icon, the application corresponding to the selected icon may be executed.

For example, the user may select the icon IO corresponding to the seventh application 2407 to execute the seventh application 2407 which is in the disabled state. The electronic device 200 may identify a state of the seventh application 2407 as the enabled state based on the icon IO selection by the user. The electronic device 200 may exclude the seventh application 2407 from the second application group GL2 to update the second application group GL2. Further, the electronic device 200 may include the seventh application 2407 into the application group GLE having the enabled state to update the application group GLE having the enabled state.

When the first application 2401 is executed, the electronic device 200 may transmit a list of the updated second application group GL2 to the first application 2401. The first application 2401 may not display the object AOB7 corresponding to the seventh application 2407 on the third user interface 263 via the display unlike in FIG. 5C.

In an embodiment, when an application associated with the enable event is the fourth application 2404 that is in the sleep state, the electronic device 200 may identify the fourth application 2404 as the enabled state. The electronic device 200 may exclude the fourth application 2404 from the first application group GL1 to update the first application group GL1. Further, the electronic device 200 may include the fourth application 2404 into the application group GLE having the enabled state to update the application group GLE having the enabled state.

In an embodiment, when an application associated with the enable event is the fourth application 2404 that is in the sleep state, and even when the enable event occurs for the fourth application 2404, the electronic device 200 may identify the fourth application 2404 as the sleep state.

Referring back to FIG. 6D, the electronic device 200 may identify that, for example, a state of the fifth application 2405 has been changed from the sleep state to the disabled state. For example, when the disable event occurs, the state of the fifth application 2405 may be changed from the sleep state to the disabled state. The electronic device 200 may exclude the fifth application 2405 from the first application group GL1 to update the first application group GL1. The electronic device 200 may include the fifth application 2405 into the second application group GL2 to update the second application group GL2. When the electronic device 200 receives the second user input from the first application 2401 after the updating, the electronic device 200 may transmit a list of the updated application group GL2 to the first application 2401. The first application 2401 may further display, for example, an object corresponding to the fifth application 2405 on the third user interface 263, unlike in FIG. 5C.

Referring to FIG. 8, in an embodiment, the disable event may be the user selecting a disable object "DO."

For example, the user may select the object AOB5 corresponding to the fifth application 2405 on the second user interface 262 of FIG. 5B. When the user selects the object AOB5, the first application 2401 may display a sixth user interface 266 via the display. The sixth user interface 266 may be a screen that displays detailed information of the fifth application 2405 which is in the sleep state.

The sixth user interface 266 may display the disable object DO. When the user selects the disable object DO, the fifth application 2405 may be changed to the disabled state. In this case, the electronic device 200 may identify a state of the fifth application 2405 and may exclude the fifth application 2405 from the first application group GL1 to update the first application group GL1. Further, the electronic device 200 may include the fifth application 2405 into the second application group GL2 to update the second application group GL2. The electronic device 200 may transmit a list of the updated first application group GL1 and a list of the updated second application group GL2 to the first application 2401.

The user may select the object OB. When the user selects the object OB, the first application 2401 may display, via the display, a previous interface (e.g., the second user interface 262 of the FIG. 5B) to the sixth user interface 266. The first application 2401 may not display the object AOB5 corresponding to the fifth application 2405 on the second user interface 262 via the display unlike in FIG. 5B, based on the list of the updated first application group GL1 received from electronic device 200.

In an embodiment, the disable event may be a case where the fifth application 2405 which is in the sleep state has not been used for a certain duration. The electronic device 200 may identify that the fifth application 2405 having the sleep state has not been used for the certain duration and may identify the fifth application 2405 in the sleep state as having the disabled state.

The electronic device 200 according to an embodiment disclosed in the disclosure may additionally provide the disabled state in addition to the enabled state and the sleep state with respect to states of the plurality of applications. The electronic device 200 may provide the disabled state that may be executed by the user's input (e.g., excluding other inputs) unlike in the sleep state to prevent an application having the sleep state from being automatically executed and increasing a battery consumption.

Hereinafter, with reference to FIG. 2 and FIG. 9, an operation of the electronic device 200 for automatically updating the application group according to an embodiment disclosed in the disclosure will be described. For the sake of clarity of illustration, duplicates of those as exemplified above are briefly described or omitted.

Figure 9:
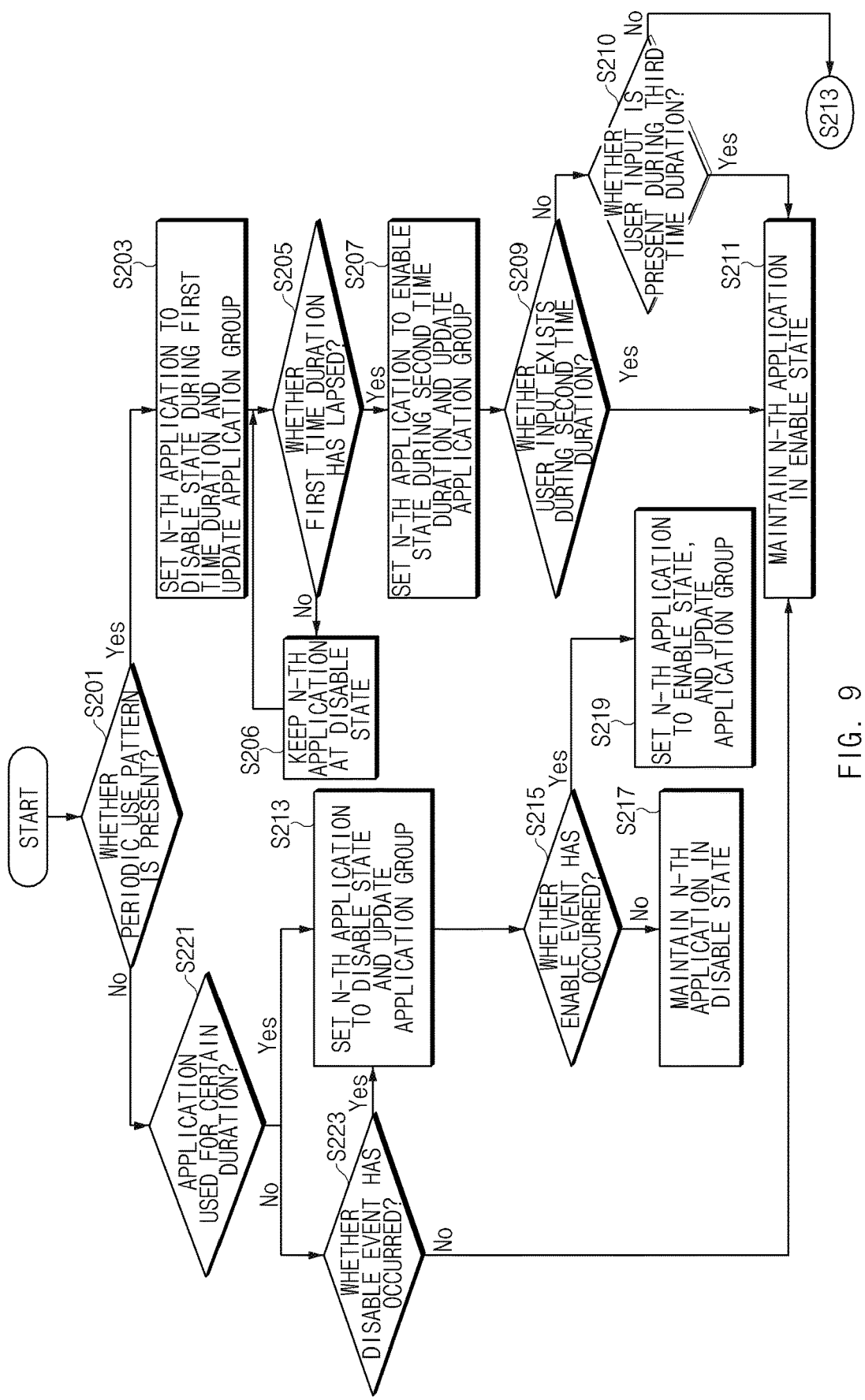
FIG. 9 is a diagram for illustrating an operation in which an electronic device automatically updates an application group according to an embodiment disclosed in the disclosure.

FIG. 9 is a diagram for illustrating an operation in which the electronic device 200 automatically updates the application group according to an embodiment disclosed in the disclosure.

Referring FIG. 2 and FIG. 9, in operation S201, the electronic device 200 may detect whether a periodic use pattern is present and available for one or more (or each) of the plurality of applications 240. For example, the electronic device 200 may identify whether the periodic use pattern exists for an n-th application among the plurality of applications 240. The n-th application may be in one of the enabled state, the sleep state, and the disabled state.

For example, the electronic device 200 may identify, for example, a use pattern where the n-th application is not executed by the user during a first time duration, and then is executed by the user when the first time duration has lapsed, and then is not executed by the user during the first time duration. When the use pattern is repeated times more than or equal to a certain number of times, the electronic device 200 may identify the use pattern as the periodic use pattern.

The first time duration may be longer than a certain duration. The certain duration may be, for example, a predefined duration. For example, the electronic device 200 may identify a use pattern where the n-th application is not executed by the user for a duration shorter than the first time duration, and then is executed by the user when the duration shorter than the first time duration has lapsed, and then is not executed by the user for the duration shorter than the first time duration. The electronic device 200 may not identify the used pattern as the periodic use pattern even when the use pattern is repeated times more than or equal to a certain number of times.

In operation S203, the electronic device 200 may set the n-th application to the disabled state during the first time duration, based on presence of the periodic use pattern for the n-th application, and may update the application groups. For example, when the n-th application is changed from the enabled state or the sleep state to the disabled state, the electronic device 200 may remove the n-th application from an application group (e.g., the GLE in FIG. 4) having the enabled state or the first application group (e.g., the GL1 in FIG. 4) to update the corresponding application group, and may including the n-th application into the second application group (e.g., the GL2 in FIG. 4) to update the second application group. For example, the n-th application may not be executed by the user for the first time duration (e.g., 30 days), and then may be executed by the user when the first time duration has lapsed (e.g., 31st day) and then, may not be executed by the user for the first time duration (e.g., 30 days). The electronic device 200 may identify an execution pattern of the n-th application as the periodic use pattern of the n-th application.

In an embodiment, the first time duration may have an error range. For example, the n-th application may not be executed by the user for the first time duration (e.g., 28 to 30 days), and then may be executed by the user when the first time duration has lapsed and then, may not be executed by the user for the first time duration (e.g., 28 to 32 days).

In operation S205, the electronic device 200 may determine whether the first time duration has lapsed.

In operation S206, when the first time duration has not lapsed, the electronic device 200 may maintain the n-th application at the disabled state and return to operation S205 to predetermine whether the first time duration has lapsed.

In operation S207, when the first time duration has lapsed, the electronic device 200 may set the n-th application to the enabled state during a second time duration, and may update an application group having the enabled state and the second application group.

The second time duration may be, for example, a duration after the first time duration has lapsed. For example, when the first time duration is 30 days, the second time duration may mean a certain duration starting from 31st day.

In operation S209, the electronic device 200 may determine whether a user input is detected during the second time duration. The user input may be, for example, associated with executing the n-th application (e.g., be an input made to the application itself) . . . .

In operation S211, when the user input is identified, the electronic device 200 may maintain the n-th application in the enabled state.

In operation S210, when no user input is identified during the second time duration, the electronic device 200 may determine whether an user input is detected during the third time duration. The third time duration may be, for example, a time duration beginning and ending after the second time duration has lapsed. The user input may be a user input associated with executing the n-th application.

In operation S213, when the user input associated with the execution of the n-th application is not identified during the third time duration, the electronic device 200 may set the n-th application to the disabled state, and may update the application group. For example, the electronic device 200 may update the application group having the enabled state by deleting the n-th application from the application group having the enabled state. The electronic device 200 may update the second application group by including the n-th application into the second application group.

In operation S215, the electronic device 200 may determine whether the enable event associated with the n-th application has occurred. In an embodiment, as described above, the enable event may include selection of the enable object (the "EO" of FIG. 7A) via the first application (see FIG. 5A). In an embodiment, as described above, the enable event may selection of the icon (the IO of FIG. 7B) to execute the n-th application.

In operation S217, when the enable event does not occur, the electronic device 200 may maintain the n-th application in the disabled state.

In operation S219, when the enable event occurs, the electronic device 200 may set the n-th application to the enabled state, and may update the application group.

In operation S221, the electronic device 200 may determine whether the n-th application has been used for a certain duration, based on absence of the periodic use pattern for the n-th application.

In operation S213, when the n-th application has not been used for the certain duration, the electronic device 200 may set the n-th application to the disabled state, and may update the application group.

In operation S223, when the n-th application has been used for the certain duration, the electronic device 200 may determine whether the disable event associated with the n-th application has occurred.

In operation S213, when the disable event occurs, the electronic device 200 may set the n-th application to the disabled state, and may update the application group.

In operation S211, when the disable event does not occur, the electronic device 200 may maintain the n-th application in the enabled state.

In an embodiment, the disable event may be a case where the user selects the disable object DO and thus the n-th application is disabled by the user, as illustrated with reference to FIG. 8.

In an embodiment, the disable event may be associated with a location of the electronic device 200.

For example, when the electronic device 200 is connected to an AP (access point) located in a specific place, the electronic device 200 may maintain the state of the n-th application in the enabled state. When the connection with the AP located in the specific location is disabled, the electronic device 200 may set the state of the n-th application to the disabled state.

For example, the electronic device 200 may identify that the user uses the n-th application at a specific location (e.g., and does not use it in other locations). The electronic device 200 may determine the location of the electronic device 200 using GPS information received by the GPS module, a base station, a WPS (WiFi positioning system), a beacon signal, and the like. The electronic device 200 may maintain the n-th application in the enabled state when the user is identified as being present in a specific place via the location of the electronic device 200. The electronic device 200 may set the state of the n-th application to the disabled state when the user is identified as being out of the specific place via the location of the electronic device 200 (operation S213).

In an embodiment, the disable event may be associated with a time set in the electronic device 200. For example, the electronic device 200 may set the n-th application to the disabled state for a timing set by the user (e.g., 11 pm to 8 am) (the operation 213). When the electronic device 200 identifies that a current time is not the timing set by the user, the electronic device 200 may set the n-th application to the enabled state (operation S219).

The electronic device 200 according to an embodiment disclosed in the disclosure may automatically determine the state of each of the plurality of applications to update the application group, thereby reduce the battery consumption of the electronic device 200.

Hereinafter, with reference to FIG. 4 and FIG. 10, a difference between the sleep state and the disabled state according to an embodiment disclosed in the disclosure will be described. For the sake of clarity of illustration, duplicates of those as exemplified above are briefly set forth or omitted.

Hereinafter, it is assumed that the electronic device 200 of FIG. 2 performs a process of FIG. 10. An operation described as being performed by the electronic device may be implemented using instructions that may be performed or executed by the processor 220 of the electronic device. The instructions may be stored in, for example, a computer recording medium or the memory 230 of the electronic device shown in FIG. 2.

Figure 10:
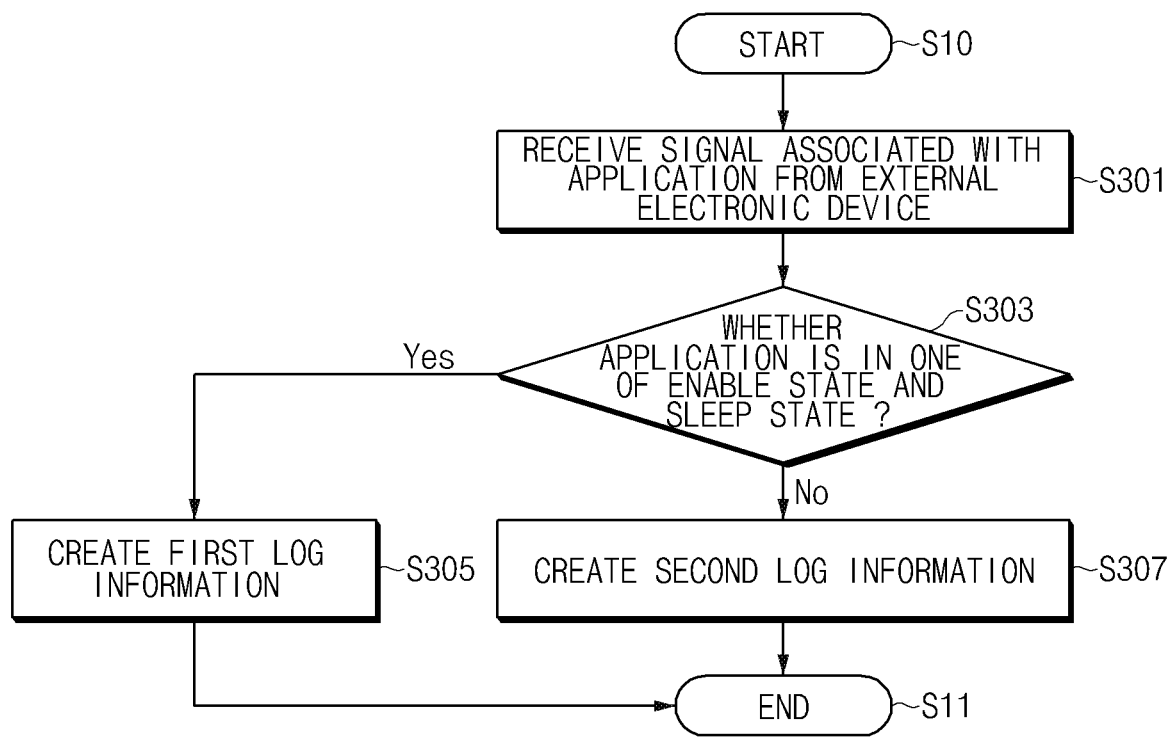
FIG. 10 is a diagram illustrating an operation in which an electronic device generates different log information based on a state of an application according to an embodiment disclosed in the disclosure.

FIG. 10 is a diagram for illustrating an operation in which the electronic device 200 creates different log information based on a state of an application according to an embodiment disclosed in the disclosure.

Referring to FIG. 4 and FIG. 10, in operation S301, the electronic device 200 may receive a signal associated with an application from an external electronic device (e.g., the electronic device 102 and/or the electronic device 104 of FIG. 1).

In operation S303, the electronic device 200 may determine whether the application is in one of the enabled state and the sleep state.

In operation S305, when the application is in one of the enabled state and the sleep state, the electronic device 200 may create first log information. The first log information may include, for example, an indication that an application is installed in the electronic device 200.

In operation S307, when the application is in the disabled state, the electronic device 200 may create second log information. The second log information may include an indication opposite to the indication of the first log information. That is, the second log information may include, for example, an indication that an application is not found in the electronic device 200. The second log information may include, for example, an indication that an application is not installed in the electronic device 200.

For example, when a signal received from an external electronic device is associated with the fourth application 2404 that is in the sleep state, the electronic device 200 may create the first log information. That is, the electronic device 200 may identify that the fourth application 2404 is installed in the electronic device 200. The electronic device 200 may not forward the signal received from the external electronic device to the fourth application 2404 based on the fourth application 2404 being in the sleep state. Thus, the signal received from the external electronic device may not be delivered to the fourth application 2404.

For example, when the signal received from the external electronic device is associated with the sixth application 2406 that is in the disabled state, the electronic device 200 may create the second log information. The electronic device 200 may identify that the sixth application 2406 is not installed in the electronic device 200. Thus, the signal received from the external electronic device may not be delivered to the sixth application 2406.

Hereinafter, with reference to FIG. 2, FIG. 4, FIG. 11, FIG. 12A and FIG. 12B, a difference between the sleep state and the disabled state according to an embodiment disclosed in the disclosure will be described. For clarity of illustration, duplicates of those as exemplified above are briefly set forth or are omitted.

Hereinafter, it is assumed that the electronic device 200 of FIG. 2 performs a process of FIG. 11. An operation described as being performed by the electronic device may be implemented using instructions that may be performed or executed by the processor 220 of the electronic device. The instructions may be stored in, for example, a computer recording medium or the memory 230 of the electronic device shown in FIG. 2.

Figure 11:
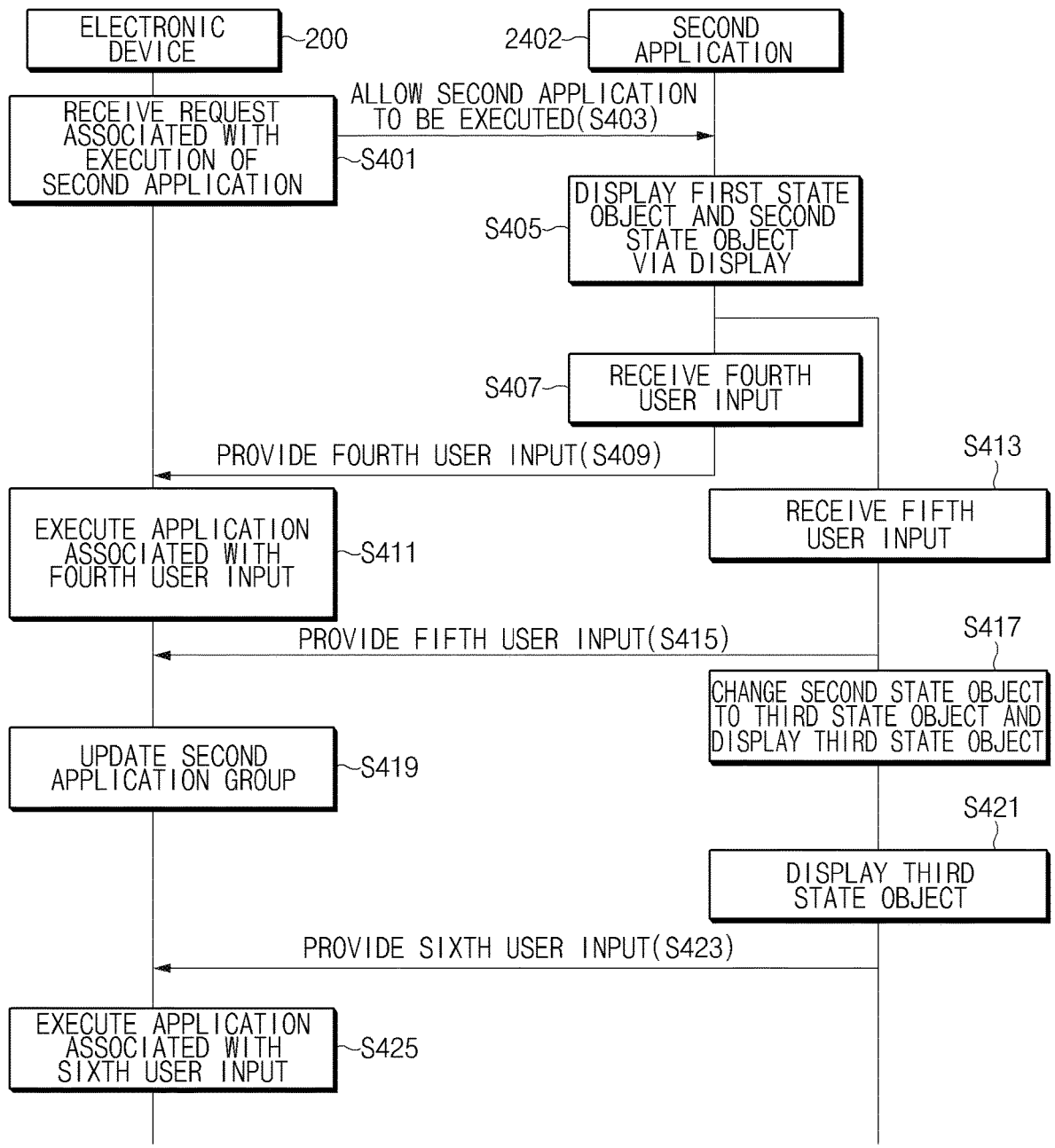
FIG. 11 is a flow chart for illustrating an operation of the electronic device according to an embodiment disclosed in the disclosure.
Figure 12A:
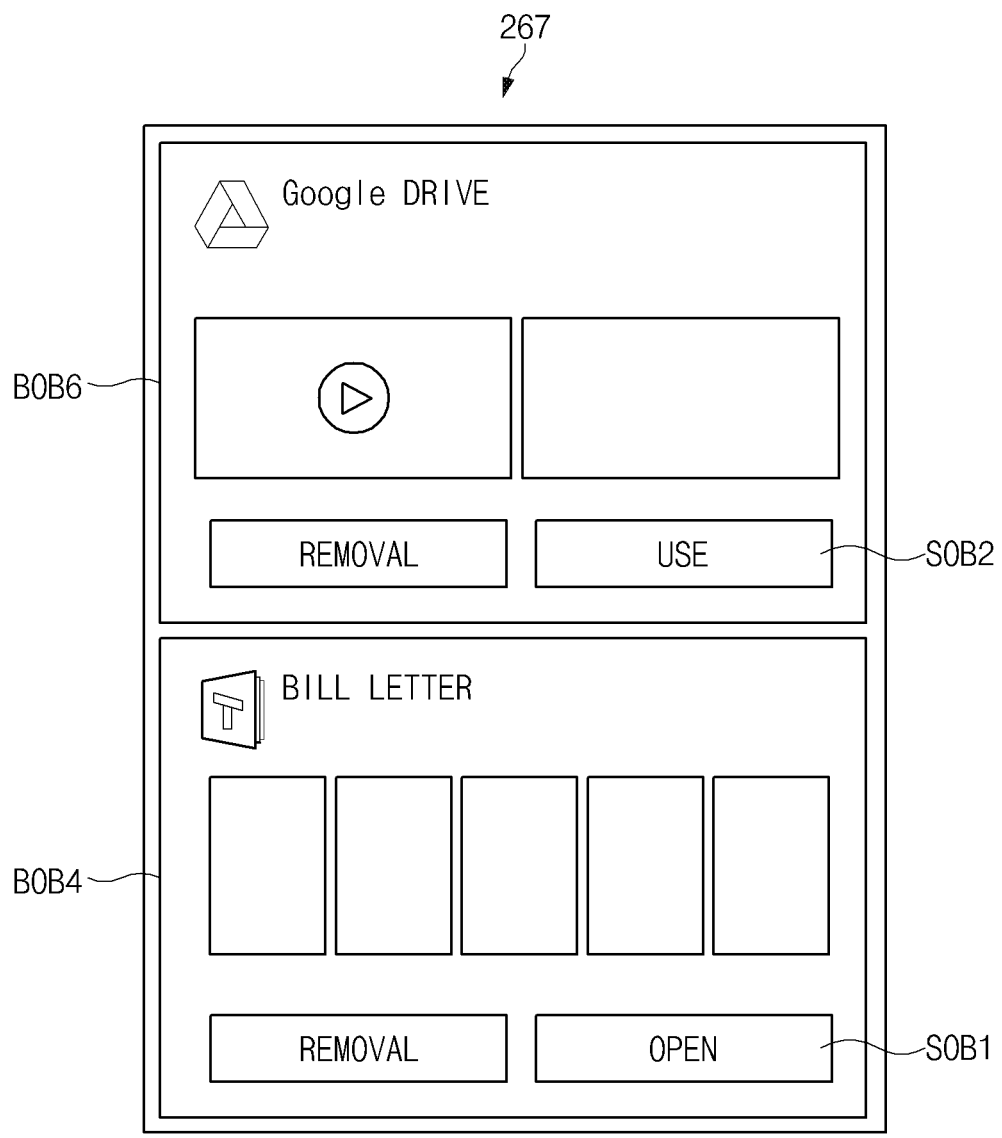
FIG. 12A is a diagram for illustrating an operation of a second application according to an embodiment disclosed in the disclosure.
Figure 12B:
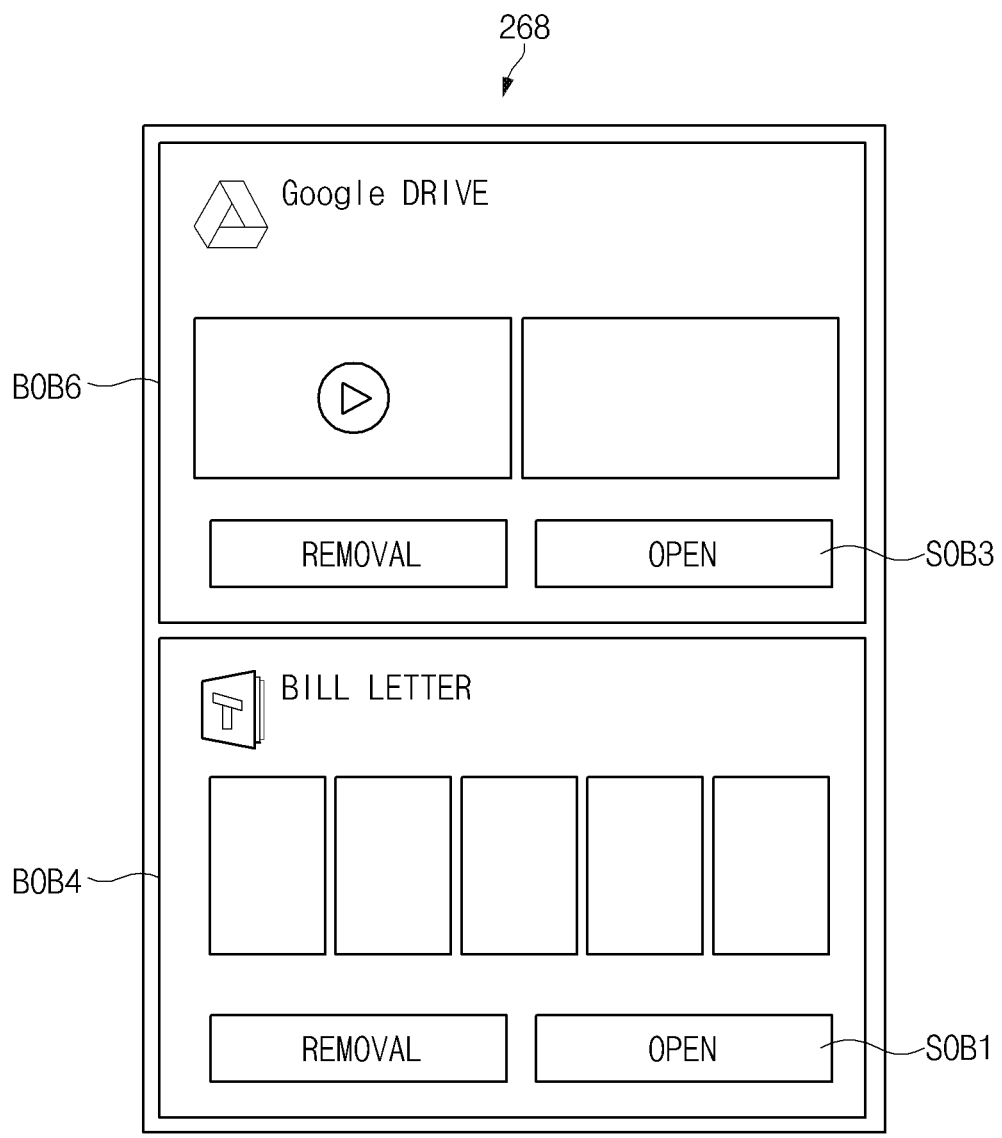
FIG. 12B is a diagram for illustrating an operation of a second application according to an embodiment disclosed in the disclosure.

FIG. 11 is a flow chart for illustrating an operation of the electronic device 200 according to an embodiment disclosed in the disclosure. FIG. 12A is a diagram illustrating an operation of the second application according to an embodiment disclosed in the disclosure. FIG. 12B is a diagram illustrating an operation of the second application according to an embodiment disclosed in the disclosure.

Referring to FIG. 11, in operation S401, the electronic device 200 may receive a request associated with execution of the second application 2402 among the plurality of applications.

In operation S403, the electronic device 200 may allow the second application 2402 to be executed.

In operation S405, the second application 2402 may display a first state object and a second state object via the display (e.g., the display 260).

Referring to FIG. 12A, a seventh user interface 267 may be a screen of the second application 2402 as executed which is displayed via the display. For example, an object BOB6 corresponding to the sixth application 2406, an object BOB4 corresponding to the fourth application 2404, a first state object SOB1 and a second state object SOB2 may be displayed via the display. The object BOB6 corresponding to the sixth application 2406, the object BOB4 corresponding to the fourth application 2404, the first state object SOB1 and the second state object SOB2 may be, for example, fields that the user may select via the display. In an embodiment, when the display is a touch screen display, the user may touch the object BOB6 corresponding to the sixth application 2406, the object BOB4 corresponding to the fourth application 2404, the first state object SOB1, and the second state object SOB2.

When the user selects one of the object BOB6 corresponding to the sixth application 2406, the object BOB4 corresponding to the fourth application 2404, the first state object SOB1 and the second state object SOB2, instructions corresponding to the selected object may be executed. The user may select the object BOB6 corresponding to the sixth application 2406 and the object BOB4 corresponding to the fourth application 2404 to check detailed information of the sixth application 2406 and the fourth application 2404.

Referring back to FIG. 11, in operation S407, the second application 2402 may receive a fourth user input. The fourth user input may be associated with selection of the first state object SOB1, which in turn is associated with a state of the application having the sleep state.

In operation S409, the second application 2402 may transmit (e.g., provide) the fourth user input to the processor of the electronic device 200.

In operation S411, according to an embodiment, the electronic device 200 may update the first application group GL1, and may execute an application associated with the fourth user input. The electronic device 200 may exclude an application with the sleep state from the first application group GL1 based on the fourth user input associated with the selection of the first state object to update the first application group GL1. The electronic device 200 may include an application associated with the fourth user input into the application group GLE having the enabled state such that the application group GLE having the enabled state may be updated. The electronic device 200 may immediately execute an application associated with the fourth user input based on the fourth user input.

In an embodiment, the electronic device 200 may not update the first application group GL1 and may execute the application associated with the fourth user input. The electronic device 200 may not exclude an application having the sleep state from the first application group GL1 based on the fourth user input associated with the selection of the first state object. For example, even when the enable event occurs for an application having the sleep state, the electronic device 200 may maintain the sleep state without excluding the application having the sleep state from the first application group GL1.

Referring back to FIG. 12A, the user may select the first state object SOB1 to execute the fourth application 2404 which is in the sleep state. The first state object SOB1 may display text associated with the state of the fourth application 2404. For example, when selecting the first state object SOB1 based on the fourth application 2404 being in the sleep state, the first state object SOB1 may display text indicating that the fourth application 2404 may be immediately executed. The user may select the first state object SOB1 to execute the fourth application 2404 immediately.

In other words, when an application to be executed is in the sleep state or the enabled state, the electronic device 200 may execute immediately the application via the second application, based on one user input.

Referring back to FIG. 11, in operation S413, the second application 2402 may receive a fifth user input. The fifth user input may be associated with selection of the second state object SOB2 associated with a state of the application having the disabled state.

In operation S415, the second application 2402 may provide the fifth user input to processor of the electronic device 200.

In operation S417, the second application 2402 may change the second state object SOB2 to the third state object SOB3 and display the third state object SOB3 via the display.

In operation S419, the electronic device 200 may exclude an application with the disabled state from the second application group GL2 based on the fifth user input associated with the selection of the second state object SOB2, such that the second application group GL2 may be updated. The electronic device 200 may set an application having the disabled state to an enable state (e.g., executed state) based on the fifth user input.

In operation S421, the second application 2402 may receive a sixth user input. The sixth user input may be associated with selection of the third state object SOB3 associated with a state of an application changed from the disabled state to the executable or enabled state.

In operation S423, the second application 2402 may transmit the sixth user input to the electronic device 200.

In operation S425, the electronic device 200 may immediately execute an application having the executable or enabled state based on the sixth user input associated with the selection of the third state object.

Referring back to FIG. 12A, the second application 2402 may display the second state object SOB2 that is different from the first state object SOB1 based on the sixth application 2406 being in the disabled state. The second state object SOB2 may display text associated with the state of the sixth application 2406. For example, the second state object SOB2 may display a text indicating that the second state object SOB2 should be selected to change the sixth application 2406 to the executable or enabled state, based on the sixth application 2406 being in the disabled state. That is, the user may not execute the sixth application 2406 immediately by selecting the second state object SOB2. Rather, the user may change the sixth application 2406 to the executable or enabled state by selecting the second state object SOB2.

Referring to FIG. 12B, an eighth user interface 268 may be a screen displayed via the display after the user selects the second state object SOB2 on the seventh user interface 267. Based on the fifth user input corresponding to the selection of the second state object SOB2, the second application 2402 may change the second state object SOB2 to the third state object SOB3 and display the third state object SOB3 via the display.

For example, the third state object SOB3 may display text meaning that the sixth application 2406 may be executed immediately when the third state object SOB3 is selected. The user may execute the sixth application 2406 immediately by selecting the third state object SOB3.

In other words, when an application to be executed is in the disabled state, the electronic device 200 may execute immediately the application via the second application, based on at least two times user inputs.

Hereinafter, with reference to FIG. 2, FIG. 4 and FIG. 13, the disclosure illustrates a difference between the sleep state and the disabled state according to an embodiment disclosed in the disclosure. For clarity of illustration, duplicates of those as exemplified above are briefly set forth or are omitted.

Figure 13:
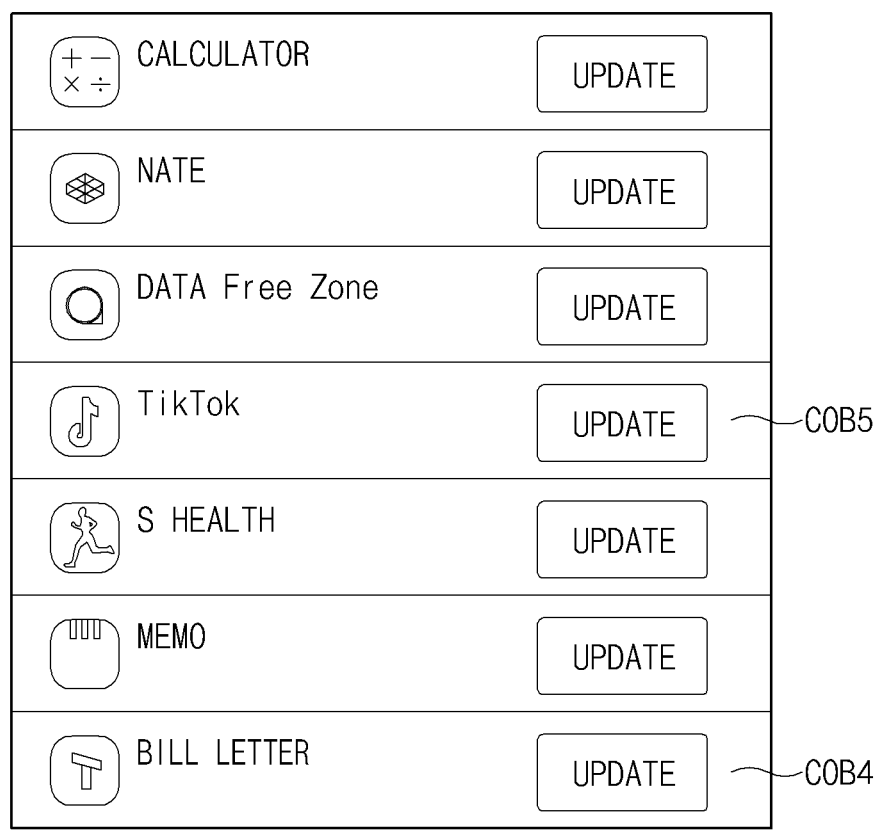
FIG. 13 is a diagram for illustrating a ninth user interface of a second application according to an embodiment disclosed in the disclosure.

FIG. 13 is a diagram to illustrate a ninth user interface 269 of the second application 2402 according to an embodiment disclosed in the disclosure.

Referring to FIG. 13, the ninth user interface 269 may be a screen of the second application 2402 as executed which is displayed via the display. For example, the ninth user interface 269 may display an application as an automatic update target among the plurality of applications 240 installed in the electronic device 200. For example, an object COB4 corresponding to the fourth application 2404 and an object COB5 corresponding to the fifth application 2405 may be displayed via the display. In other words, applications corresponding to the object displayed on the ninth user interface 269 may be automatically updated without the user input.

The second application 2402 may display the objects COB4 and COB5 on the ninth user interface 269 based on the fourth application 2404 and the fifth application 2405 being in the sleep state.

The second application 2402 may not display the object corresponding to each of the sixth application 2406 and the seventh application 2407 on the ninth user interface 269, based on the sixth application 2406 and the seventh application 2407 being in the disabled state.

Hereinafter, with reference to FIG. 14, the disclosure illustrates an operation of the electronic device 200 according to an embodiment disclosed in the disclosure. For the sake of clarity of illustration, duplicates of those as exemplified above are briefly set forth or are omitted.

Figure 14:
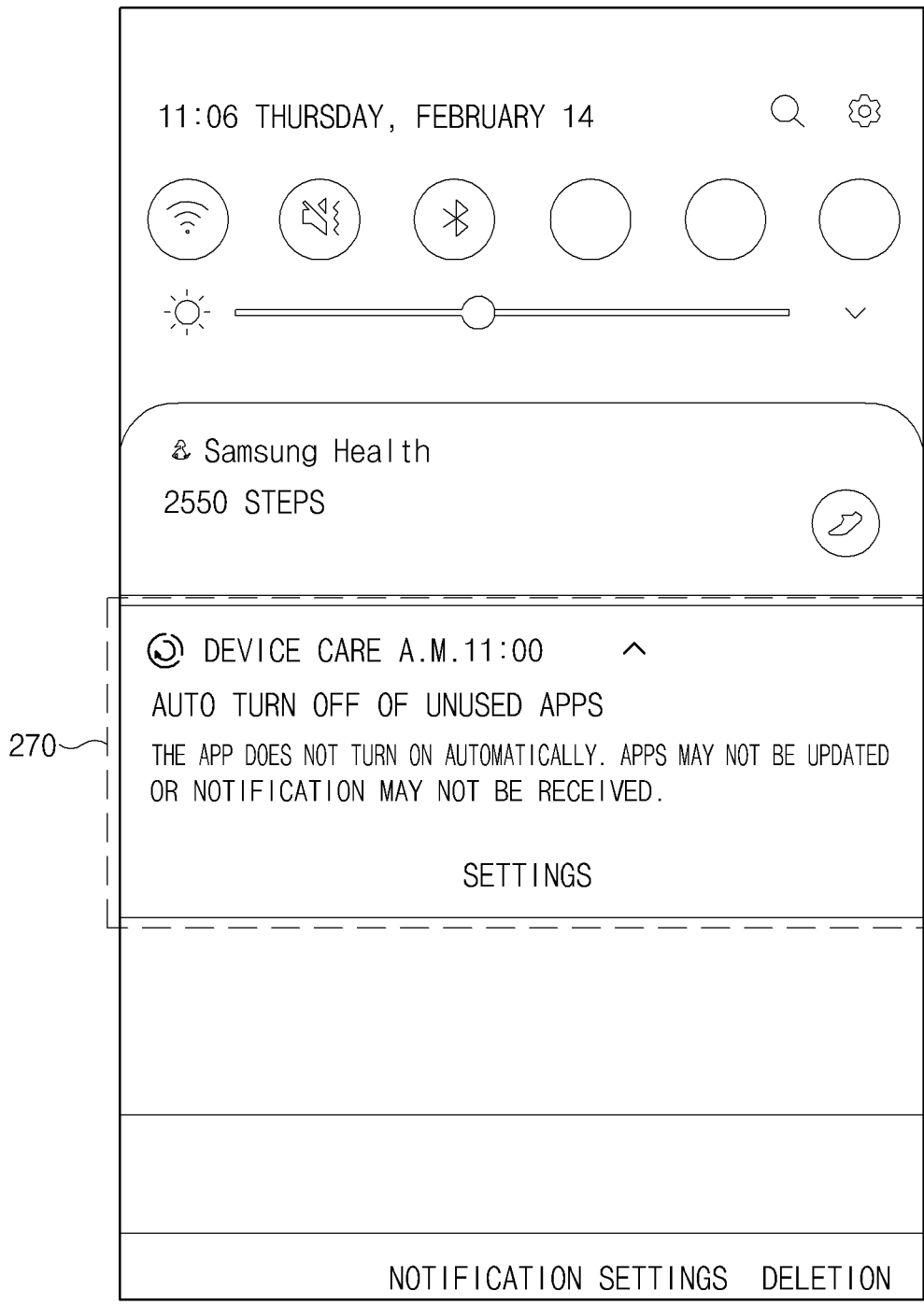
FIG. 14 is a diagram for illustrating an operation of providing a notification to the user by the electronic device according to an embodiment disclosed in the disclosure.

FIG. 14 is a diagram for illustrating an operation of providing a notification to the user by the electronic device according to an embodiment disclosed in the disclosure.

Referring to FIG. 14, a tenth user interface 270 may be a screen displayed via the display for the electronic device (e.g., the electronic device 200 of FIG. 2) to provide information about an application having the disabled state to the user.

The electronic device may identify a state of each of the plurality of applications (e.g., the plurality of applications 240 of FIG. 2) and may provide, to the user, a user notification (e.g., the tenth user interface 270) informing the user of an application whose state is changed to the disabled state. The user notification may be, for example, a notification that prompts the user to select whether to change the state of the application to the disabled state. For example, the user notification may be a notification indicating that the second application group (e.g., the second application group GL2 in FIG. 4) has been updated.

The user may recognize, for example, the user notification, and may choose whether to change the application to the disabled state. That is, when the user provides the electronic device with an input associated with not changing the application to the disabled state, the electronic device may not change the application to the disabled state. When the user provides the electronic device with an input associated with changing the application to the disabled state, the electronic device may change the application to the disabled state and may update the second application group by adding the corresponding application to the second application group.

In an embodiment, the electronic device may provide the user notification to the user before adding the application to the second application group (e.g., the second application group GL2 of FIG. 6B).

For example, as illustrated with reference to FIG. 6B, when it is identified that the third application 2403 is in the disabled state, the electronic device may provide the user notification to the user.

For example, when a target application (e.g., the third application 2403 of FIG. 6B) whose state is to be changed to the disabled state is selected via artificial intelligence, the electronic device may identify the target application, and may provide the user notification to the user before adding the target application to the second application group.

For example, the electronic device may provide the user notification to the user when a target application continuing to cause serious problems in the electronic device is identified. The electronic device may identify, as the target application, an application that continuously causes the electronic device to reboot or changes to the sleep state but causes a problem related to a normal operation of the electronic device.

The electronic device may change the third application to the disabled state based on an user input associated with the updating of the second application group, and may update the second application group by adding third application to the second application group.

In an embodiment, when an application is added to the second application group (e.g., the second application group GL2 in FIG. 6B), the electronic device may provide the user notification to the user. For example, as illustrated in FIG. 6B, when the third application 2403 is added to the second application group GL2, the electronic device may notify the user that the second application group has been updated via the user notification.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program #40) including one or more instructions that are stored in a storage medium (e.g., internal memory 136 or external memory 138) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to the embodiments disclosed in the disclosure, the battery consumption of the electronic device by the application may be reduced.

In addition, various effects may be provided that are identified directly or indirectly from the disclosure.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
a display;
a processor; and
a memory operatively connected to the processor, the memory storing instructions and a plurality of applications installed in the electronic device, wherein the instructions, which when executed, cause the processor to:
identify states for each of the plurality of applications, the states each including one of an enabled state, a sleep state, or a disabled state, wherein applications in the sleep state are grouped into a first application group, and applications in the disabled state are grouped into a second application group;
execute a first application to display a first user interface including a first field, a second field, and a third field including a selectable object via the display, the first application being further configured to display a second user interface displaying a first list indicating applications included in the first application group after a user selects the first field, and to display a third user interface displaying a second list indicating applications included in the second application group after the user selects the second field; and
response to detecting a first user input selecting the selectable object included in the third field of the first user interface of the first application, re-identify the states of every application included in the plurality of applications and update the first application group and the second application group;
wherein the plurality of applications includes a second application, based on a periodic use pattern stored for the second application, change the second application to the disabled state for a first time duration indicated by the periodic use pattern, and include the second application into the second application group; when the first time duration has lapsed, change the second application to the enabled state for a second time duration indicated by the periodic use pattern, and exclude the second application from the second application group; and when the second time duration has lapsed and in absence of a request to execute the second application, change the second application to the disabled state for a third time duration, and update the second application group to include the second application.

2. The electronic device of claim 1, wherein the plurality of applications includes a second application and a third application, wherein the second application is grouped into the first application group, and the third application is grouped into the second application group, and wherein the instructions cause the processor to: based on receiving a signal associated with the second application from an external electronic device, generate a first log information indicating that the second application is installed in the electronic device; and based on receiving a signal associated with the third application from the external electronic device, create a second log information indicating including that the third application is uninstalled on the electronic device.

3. The electronic device of claim 2, wherein the instructions cause the processor to store first data about the second application and second data about the third application in the memory.

4. The electronic device of claim 2, wherein the instructions cause the processor to display an icon representing the third application on a user interface displayed on the display.

5. The electronic device of claim 4, wherein the instructions cause the processor to: based on a second user input selecting the icon, update the second application group to exclude the third application from the second application group; and transmit the updated second application group to the first application.

6. The electronic device of claim 1, wherein the plurality of applications includes a second application and a third application, wherein the second application is grouped into the first application group, and the third application is grouped into the second application group, and wherein the instructions cause the processor to: execute a fourth application including displaying a first state object indicating that the second application is in a first state, and a second state object indicating that the third application is in a second state; based on a second user input selecting the first state object, update the first application group to exclude the second application from the first application group and execute the second application; based on a third user input selecting the second state object, update the second application group to exclude the third application from the second application group, and transmit the updated second application group to the fourth application; and based on a fourth user input selecting a third state object representing a state of the third application on the display, execute the third application.

7. The electronic device of claim 1, wherein the plurality of applications includes a second application having the enabled state, wherein the instructions cause the processor to: re-identify a state of the second application; when the identified state of the second application is the sleep state, update the first application group to include the second application; and
when the identified state of the second application is the disabled state, update the second application group to include the second application.

8. The electronic device of claim 1, wherein the instructions cause the processor to: based on the first user input selecting the selectable object, re-identify the states of each of the plurality of applications; generate and output notification indicating that an application is changed to the disabled state; and based on an user input requesting update of the second application group, update the second application group to include the application that is changed to the disabled state.

9. The electronic device of claim 1, wherein the instructions are further executable to cause the electronic device to: based on a second user input selecting the first field of the first application, control the display to display the first list indicating applications of the first application group disposed in the sleep state; and based on a third user input selecting a specific application from among the first list, control the display to an application information screen including a force stop icon selectable to terminate the specific application currently set in the sleep state.

10. The electronic device of claim 1, wherein the instructions are further executable to cause the electronic device to: based on a second user input selecting the second field of the first application, control the display to display the second list indicating applications of the second application group disposed in the disabled state; and based on a third user input selecting a specific application from among the second list, control the display to an application information screen including a use icon selectable to activate the specific application currently set in the disabled state.

11. A method in an electronic device, the method comprising: identifying, by a processor, states for each of a plurality of applications, the states each including one of an enabled state, a sleep state, or a disabled state, wherein applications in the sleep state are grouped into a first application group, and applications in the disabled state are grouped into a second application group;
 executing a first application to display, on a display, a first user interface including a first field, a second field, and a third field including a selectable object, the first application being further configured to display a second user interface displaying a first list indicating applications included in the first application group after a user selects the first field, and to display a third user interface displaying a second list indicating applications included in the second application group after the user selects the second field; and
 receiving a first user input via input circuitry selecting the selectable object included in the third field of the first user interface of the first application; and response to the received first user input, re-identifying the states of every application included in the plurality of applications and update the first application group and the second application group;
 wherein the plurality of applications includes a second application, based on a periodic use pattern stored for the second application, changing the second application to the disabled state for a first time duration indicated by the periodic use pattern, and including the second application into the second application group; when the first time duration has lapsed, changing the second application to the enabled state for a second time duration indicated by the periodic use pattern, and excluding the second application from the second application group; and when the second time duration has lapsed and in absence of a request to execute the second application, changing the second application to the disabled state for a third time duration, and updating the second application group to include the second application.

12. The method of claim 11, wherein the plurality of applications includes a second application and a third application, and wherein the second application is grouped into the first application group, and the third application is grouped into the second application group, the method further comprising: based on receiving a signal associated with the second application from an external electronic device, generating a first log information indicating that the second application is installed in the electronic device; and based on receiving a signal associated with the third application from the external electronic device, creating a second log information indicating including that the third application is uninstalled on the electronic device.

13. The method of claim 12, wherein the method further comprises displaying an icon representing the third application on a user interface displayed on the display.

14. The method of claim 13, wherein the method further comprises: based on a second user input selecting the icon, updating the second application group to exclude the third application from the second application group; and transmitting the updated second application group to the first application.

15. The method of claim 11, wherein the plurality of applications includes a second application and a third application, and wherein the second application is grouped into the first application group, and the third application is grouped into the second application group, the method further comprising: executing a fourth application including displaying a first state object indicating that the second application is in a first state, and a second state object indicating that the third application is in a second state; based on a second user input selecting the first state object, updating the first application group to exclude the second application from the first application group and executing the second application; based on a third user input selecting the second state object, updating the second application group to exclude the third application from the second application group, and transmitting the updated second application group to the fourth application; and based on a fourth user input selecting a third state object representing a state of the third application on the display, executing the third application.

16. The method of claim 11, further comprising: based on a second user input selecting the first field of the first application, displaying the first list indicating applications of the first application group disposed in the sleep state; and based on a third user input selecting a specific application from among the first list, displaying an application information screen including a force stop icon selectable to terminate the specific application currently set in the sleep state.

17. The method of claim 11, further comprising: based on a second user input selecting the second field of the first application, displaying the second list indicating applications of the second application group disposed in the disabled state; and based on a third user input selecting a specific application from among the second list, displaying an application information screen including a use icon selectable to activate the specific application currently set in the disabled state.

* * * * *